United States Patent
Shimizu et al.

(10) Patent No.: US 6,777,524 B1
(45) Date of Patent: Aug. 17, 2004

(54) POLYETHER POLYURETHANE

(75) Inventors: Atsushi Shimizu, Fuchu (JP);
Mutsuhisa Furukawa, Nagasaki (JP);
Kiyoo Kato, Kawasaki (JP); Yoshiyuki Asahina, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/049,827

(22) PCT Filed: Aug. 18, 2000

(86) PCT No.: PCT/JP00/05570
§ 371 (c)(1),
(2), (4) Date: Feb. 19, 2002

(87) PCT Pub. No.: WO01/14444
PCT Pub. Date: Mar. 1, 2001

(30) Foreign Application Priority Data

Aug. 19, 1999 (JP) .......................... 11-233017

(51) Int. Cl.$^7$ ........................ C08G 18/48; C08G 18/10; C07F 7/10; C07C 271/10; C07C 271/26
(52) U.S. Cl. ............................ 528/76; 528/59; 528/60; 528/61; 528/62; 528/63; 528/64; 528/65; 556/419; 556/420; 556/421; 560/25; 560/26; 560/115; 560/158; 560/330; 560/355; 560/358; 560/359; 560/360
(58) Field of Search ............................ 528/59, 60, 61, 528/62, 63, 64, 65, 76; 556/419, 420, 421; 560/25, 26, 115, 158, 330, 355, 358, 359, 360

(56) References Cited

U.S. PATENT DOCUMENTS

| 4,568,775 A | 2/1986 | Aoshima et al. ............ 568/617 |
| 4,658,065 A | 4/1987 | Aoshima et al. ............ 564/487 |
| 4,670,519 A | 6/1987 | Mueller ...................... 525/342 |
| 4,677,231 A | 6/1987 | Aoshima et al. ............ 568/617 |

FOREIGN PATENT DOCUMENTS

| JP | 60-108424 | 6/1985 |
| JP | 60-149623 | 8/1985 |
| JP | 4-8719 | 1/1992 |
| JP | 4-213316 | 8/1992 |
| JP | 4-351619 | 12/1992 |
| JP | 2000-309622 | 11/2000 |

*Primary Examiner*—Rabon Sergent
(74) *Attorney, Agent, or Firm*—Birch, Stewart, Kolasch & Birch, LLP

(57) ABSTRACT

Disclosed is a polyether polyurethane comprising (A) at least one polyisocyanate having two or more isocyanate groups, which is selected from the group consisting of an aromatic polyisocyanate and an aliphatic polyisocyanate; (B) a polyoxytetramethylene glycol (PTMG) having a number average molecular weight of from 500 to 4,000, a molecular weight distribution (Mw/Mn) of 1.75 or less, and a content of high molecular weight PTMG molecules of 10% by weight or less; and (C) at least one chain extender selected from the group consisting of a $C_2$–$C_{10}$ polyol having two or more hydroxyl groups and a $C_2$–$C_{10}$ polyamine having two or more amino groups. Also disclosed is a urethane prepolymer which comprises the above-mentioned components (A) and (B) and which has terminal isocyanate groups.

10 Claims, 12 Drawing Sheets

POLYETHER POLYURETHANE

This application is the national phase under 35 U.S.C. §371 of PCT International Application No. PCT/JP00/05570 which has an International filing date of Aug. 18, 2000, which designated the United States of America.

BACKGROUND OF THE INVENTION

1. Field of the Invention

The present invention relates to a polyether polyurethane. More particularly, the present invention is concerned with a polyether polyurethane comprising (A) at least one polyisocyanate having two or more isocyanate groups, which is selected from the group consisting of an aromatic polyisocyanate and an aliphatic polyisocyanate; (B) a specific polyoxytetramethylene glycol (PTMG); and (C) at least one chain extender selected from the group consisting of a $C_2$–$C_{10}$ polyol having two or more hydroxyl groups and a $C_2$–$C_{10}$ polyamine having two or more amino groups. The polyether polyurethane of the present invention exhibits excellent properties including high elastic modulus, excellent elastic properties at low temperatures and high flexibility, as compared to the conventional polyether polyurethanes. By virtue of these excellent properties, the polyether polyurethane of the present invention can be advantageously used in various application fields where conventional polyether polyurethanes are used. Further, the present invention is also concerned with a urethane prepolymer comprising (A) at least one polyisocyanate having two or more isocyanate groups, which is selected from the group consisting of an aromatic polyisocyanate and an aliphatic polyisocyanate; and (B) a specific polyoxytetramethylene glycol (PTMG), wherein the urethane prepolymer has terminal isocyanate groups.

2. Prior Art

In the production of polyether polyurethanes, various types of diols are used to control the properties thereof. For example, a low molecular weight diol is used in combination with a high molecular weight diol, such as a polyether diol, a polyester diol or a polycarbonate diol. Specific examples of polyether diols include polyoxyethylene glycol, polyoxypropylene glycol, polyoxytetramethylene glycol and modified high molecular weight diols obtained therefrom. Of the above-exemplified polyether diols, polyoxytetramethylene glycol has been used as a component constituting a soft segment of a shaped polyether polyurethane article or a polyether polyurethane elastic fiber since a long time ago.

A polyether polyurethane is produced from a polyisocyanate, a high molecular weight diol and a low molecular weight diol as main raw materials, and is a block copolymer having a soft segment composed mainly of the high molecular weight diol and a hard segment composed mainly of the polyisocyanate and the low molecular weight diol. By virtue of such structure, the polyether polyurethane exhibits rubber elasticity. The chemical composition, length of the polymer blocks, and secondary and tertiary structures of the polyether polyurethane depend mainly on the types of the polyisocyanate and the high molecular weight diol used, and have a large influence on the physical properties of an ultimate polyether polyurethane product. Especially, the choice of the soft segment is a very important factor in fields where a product obtained from a polyether polyurethane, such as an elastic fiber or a polyurethane elastomer, is required to have excellent and precisely controlled mechanical properties and visco-elastic properties.

As a conventional technique for obtaining a polyoxytetramethylene glycol (PTMG) which has been used as a high molecular weight diol, a method disclosed in Unexamined Japanese Patent Application Laid-Open Specification No. 59-215320 (corresponding to U.S. Pat. No. 4,568,775 and EP 126471) is known. Further, Unexamined Japanese Patent Application Laid-Open Specification No. 61-123626 (corresponding to U.S. Pat. No. 4,658,065 and EP 158229) and Unexamined Japanese Patent Application Laid-Open Specification No. 59-221326 (corresponding to U.S. Pat. No. 4,568,775 and EP 126471) have a description concerning the molecular weight distributions of the produced PTMG's. With respect to the techniques for removing the oligomers contained in a PTMG, Unexamined Japanese Patent Application Laid-Open Specification No. 61-123629 (corresponding to U.S. Pat. No. 4,677,231 and EP 181621) discloses a method in which a thin film evaporator is used, and Unexamined Japanese Patent Application Laid-Open Specification No. 60-108424 discloses a method in which oligomers are separated from the PTMG by using water and an alcoholic solvent. In addition, with respect to the techniques for adjusting the content of a polymerization catalyst remaining in a PTMG, Unexamined Japanese Patent Application Laid-Open Specification No. 61-118420 (corresponding to U.S. Pat. No. 4,677,231 and EP 181621) and Unexamined Japanese Patent Application Laid-Open Specification No. 61-115934 (corresponding to U.S. Pat. No. 4,677,231 and EP 181621) disclose a method in which a hydrocarbon or a halogenated hydrocarbon as an organic solvent is added to a PTMG to thereby separate the residual catalyst therefrom; and Unexamined Japanese Patent Application Laid-Open Specification No. 61-123629 (corresponding to U.S. Pat. No. 4,677,231 and EP 181621) discloses a method in which an adsorbent is used to remove the catalyst.

The characteristics (such as molecular weight, molecular weight distribution, oligomer content and residual catalyst content) of the PTMG used as a raw material for a polyether polyurethane are considered as important factors which affect the quality of the final polyether polyurethane. However, heretofore, no details are known in the art about how the characteristics of the PTMG influence the physical properties of the final polyether polyurethane. In addition, no polyether polyurethanes are known, which have been adjusted, by strictly controlling the characteristics of the raw material PTMG, so as to have a good balance of various excellent properties.

Nowadays, polyether polyurethane is an important material which is used in a wide variety of fields, and the application field thereof is expected to become more extensive. Accordingly, there has always been a demand for improvement in the quality of the polyether polyurethane. Further, improvements in different properties of the polyether polyurethane are, respectively, desired in different application fields. For example, a polyether polyurethane used as a thermoplastic elastomer is required to exhibit high elastic modulus, excellent characteristics at low temperatures, small compression set, excellent surface touch with respect to an ultimate shaped product produced therefrom, and convenience in practical use of a coating composition containing the polyether polyurethane. Similarly, in the industrial fields related to a flexible foam and a rigid foam, an RIM (Reaction Injection Molding) product, an R-RIM (Reinforced Reaction Injection Molding) product, a coating composition, an adhesive, a binder, a sealant, a fiber stock, an artificial leather and a wide variety of other polyurethane products, and in various other industrial fields related to polyurethane urea products, there has been a demand for the improvements in the properties of a polyether polyurethane.

SUMMARY OF THE INVENTION

In this situation, the present inventors have made extensive and intensive studies with a view toward solving the above-mentioned problems. As a result, it has unexpectedly been found that a polyether polyurethane, which comprises (A) at least one polyisocyanate having two or more isocyanate groups, which is selected from the group consisting of an aromatic polyisocyanate and an aliphatic polyisocyanate, (B) a polyoxytetramethylene glycol (PTMG) having a specific molecular weight, a specific molecular weight distribution and a specific content of high molecular weight molecules, which PTMG, notwithstanding low viscosity thereof, exhibits high heat resistance, and (C) at least one chain extender selected from the group consisting of a $C_2$–$C_{10}$ polyol having two or more hydroxyl groups and a $C_2$–$C_{10}$ polyamine having two or more amino groups, exhibits high elastic modulus, excellent elastic properties at low temperatures and high flexibility, as compared to the conventional polyether polyurethanes.

The present invention has been completed, based on this novel finding.

Accordingly, it is an object of the present invention to provide a polyether polyurethane having high elastic modulus, excellent elastic properties at low temperatures and high flexibility.

It is another object of the present invention to provide a urethane prepolymer which can be used as a raw material for obtaining a polyether polyurethane having high elastic modulus, excellent elastic properties at low temperatures and high flexibility.

The foregoing and other objects, features and advantages of the present invention will be apparent to those skilled in the art from the following detailed description and appended claims taken in connection with the accompanying drawings.

BRIEF DESCRIPTION OF THE DRAWINGS

In the drawings:

FIGS. 6(a) to 6(j) are polarization photomicrographs of polyether polyurethanes, wherein FIGS. 6(a) and 6(b) are polarization photomicrographs of the polyether polyurethane produced in Example 6, FIGS. 6(c) and 6(d) are polarization photomicrographs of the polyether polyurethane produced in Comparative Example 8, FIGS. 6(e) and 6(f) are polarization photomicrographs of the polyether polyurethane produced in Comparative Example 9, FIGS. 6(g) and 6(h) are polarization photomicrographs of the polyether polyurethane produced in Comparative Example 10, and FIGS. 6(i) and 6(j) are polarization photomicrographs of the polyether polyurethane produced In Comparative Example 11, and wherein the polarization photomicrographs of FIGS. 6(b), 6(d), 6(f), 6(h) and 6(j) are taken using a sensitive color plate; and FIGS. 7(a) to 7(d) are polarization photomicrographs of polyether polyurethanes, wherein FIGS. 7(a) and 7(b) are polarization photomicrographs of the polyether polyurethane produced in Example 7, and FIGS. 7(c) and 7(d) are polarization photomicrographs of the polyether polyurethane produced in Comparative Example 12, and wherein the polarization photomicrographs of FIGS. 7(b) and 7(d) are taken using a sensitive color plate.

Figure 1:
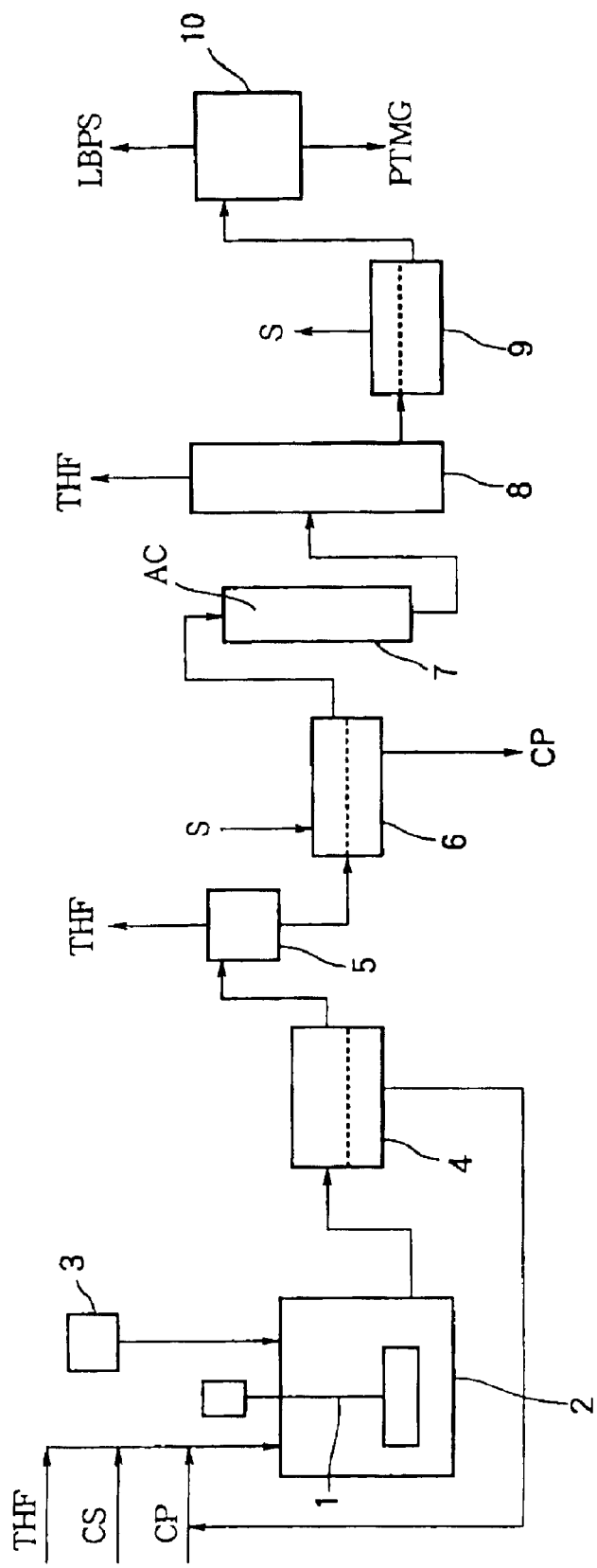
FIG. 1 is a schematic diagram showing the production system used in Reference Examples 1 and 2 for producing the specific polyoxytetramethylene glycol (PTMG) used in the present invention.

| Description of Reference Numerals | |
|---|---|
| 1: | stirrer |
| 2: | reactor |
| 3: | water feeding tank |
| 4: | first, phase-separation vessel |
| 5: | distillation vessel |
| 6: | second, phase-separation vessel |
| 7: | adsorption column |
| 8: | distillation column |
| 9: | third, phase-separation vessel |
| 10: | vacuum distillation vessel |

DETAILED DESCRIPTION OF THE INVENTION

In one aspect of the present invention, there is provided a polyether polyurethane comprising:

(A) at least one polyisocyanate having two or more isocyanate groups, which is selected from the group consisting of an aromatic polyisocyanate and an aliphatic polyisocyanate;

(B) a polyoxytetramethylene glycol (PTMG); and (C) at least one chain extender selected from the group consisting of a $C_2$–$C_{10}$ polyol having two or more hydroxyl groups and a $C_2$–$C_{10}$ polyamine having two or more amino groups, wherein the PTMG has the following characteristics (1) to (3):
(1) a number average molecular weight of from 500 to 4,000;
(2) a molecular weight distribution of 1.75 or less in terms of the Mw/Mn ratio, wherein Mw represents the weight average molecular weight of PTMG and Mn represents the number average molecular weight of PTMG; and
(3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules.

In another aspect of the present invention, there is provided a urethane prepolymer comprising:
(A) at least one polyisocyanate having two or more isocyanate groups, which is selected from the group consisting of an aromatic polyisocyanate and an aliphatic polyisocyanate; and
(B) a polyoxytetramethylene glycol (PTMG), the urethane prepolymer having terminal isocyanate groups, wherein the PTMG has the following characteristics (1) to (3):
(1) a number average molecular weight of from 500 to 4,000;
(2) a molecular weight distribution of 1.75 or less in terms of the Mw/Mn ratio, wherein Mw represents the weight average molecular weight of PTMG and Mn represents the number average molecular weight of PTMG; and
(3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules.

For easy understanding of the present invention, the essential features and various embodiments of the present invention are enumerated below.

1. A polyether polyurethane comprising:
   (A) at least one polyisocyanate having two or more isocyanate groups, which is selected from the group consisting of an aromatic polyisocyanate and an aliphatic polyisocyanate;
   (B) a polyoxytetramethylene glycol (PTMG); and
   (C) at least one chain extender selected from the group consisting of a $C_2$–$C_{10}$ polyol having two or more hydroxyl groups and a $C_2$–$C_{10}$ polyamine having two or more amino groups, wherein the PTMG has the following characteristics (1) to (3):
   (1) a number average molecular weight of from 500 to 4,000;
   (2) a molecular weight distribution of 1.75 or less in terms of the Mw/Mn ratio, wherein Mw represents the weight average molecular weight of PTMG and Mn represents the number average molecular weight of PTMG; and
   (3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules.

2. The polyether polyurethane according to item 1 above, wherein the PTMG has a heteropolyacid content of from 10 to 900 ppb by weight.

3. The polyether polyurethane according to item 1 above, wherein the content of high molecular weight PTMG molecules in the PTMG is 2 to 5% by weight.

4. A urethane prepolymer comprising:
   (A) at least one polyisocyanate having two or more isocyanate groups, which is selected from the group consisting of an aromatic polyisocyanate and an aliphatic polyisocyanate; and
   (B) a polyoxytetramethylene glycol (PTMG),
   the urethane prepolymer having terminal isocyanate groups, wherein the PTMG has the following characteristics (1) to (3):
   (1) a number average molecular weight of from 500 to 4,000;
   (2) a molecular weight distribution of 1.75 or less in terms of the Mw/Mn ratio, wherein Mw represents the weight average molecular weight of PTMG and Mn represents the number average molecular weight of PTMG; and
   (3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules.

5. The urethane prepolymer according to item 4 above, wherein the PTMG has a heteropolyacid content of from 10 to 900 ppb by weight.

6. The urethane prepolymer according to item 4 above, wherein the content of high molecular weight PTMG molecules in the PTMG is 2 to 5% by weight.

7. The urethane prepolymer according to item 4 above, wherein the terminal isocyanate groups are partly or wholly modified to have at least one functional group other than an isocyanate group, wherein the at least one functional group is introduced to the terminal isocyanate groups by addition.

8. The urethane prepolymer according to item 7 above, wherein the functional group is selected from the group consisting of a (meth)acryloyl group and a silyl group.

Hereinbelow, the polyether polyurethane of the present invention will be described in detail.

The polyether polyurethane of the present invention comprises (A) a polyisocyanate, (B) a polyoxytetramethylene glycol (PTMG), and (C) a polyol and/or a polyamine. A "polyether polyurethane" is a polyurethane containing a polyether diol as its polymeric polyol component (a soft segment). For example, when a diisocyanate and a polyether diol are reacted with each other, urethane linkage-containing prepolymers having different molecular weights are obtained as shown below.

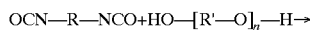

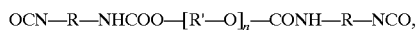

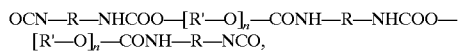

and so on.

When such a prepolymer is reacted with a $C_2$–$C_{10}$ polyol and/or a $C_2$–$C_{10}$ polyamine as a chain extender, a polyether polyurethane is obtained. For example, when a low molecular weight diol is used as a chain extender, a urethane linkage (—NH—CO—O—) is formed in the resultant polyether polyurethane. On the other hand, when a low molecular weight diamine is used as a chain extender, a urea linkage (—NH—CO—NH—) is formed in the resultant polyether polyurethane.

The polyisocyanate used as component (A) of the polyether polyurethane of the present invention is at least one polyisocyanate having two or more isocyanate groups, which is selected from the group consisting of an aromatic polyisocyanate and an aliphatic polyisocyanate. There is no limitation with respect to the number of carbon atoms of the polyisocyanate. For example, an aromatic diisocyanate, an aliphatic diisocyanate, and a polyisocyanate modified with a polyol or the like can be used.

Examples of aromatic diisocyanates include 4,4'-diphenylmethane diisocyanate, 2,4-toluene diisocyanate, 2,6-toluene diisocyanate, 1,4-phenylene diisocyanate, 1,3-phenylene diisocyanate, 1.5-naphthalene diisocyanate and xylylene diisocyanate.

Examples of aliphatic diisocyanates include diisocyanates obtained by hydrogenating the aromatic rings of the aromatic diisocyanates exemplified above, hexamethylene diisocyanates isophorone diisocyanate and 4,4-cyclohexyl diisocyanate.

Examples of modified polyisocyanates include isocyanurate type polyisocyanates.

Further examples of polyisocyanates usable as component (A) include blocked isocyanates obtained by modifying the isocyanate groups of any of the above-mentioned polyisocyanates with an oxime compound and the like.

In the present invention, the above-mentioned polyisocyanates, i.e., the aromatic diisocyanates, the aliphatic diisocyanates and the modified diisocyanates, and the like, can be used individually or in combination as the polyisocyanate (A).

The component (B) of the polyether polyurethane of the present invention is a polyoxytetramethylene glycol (PTMG). The PTMG used in the present invention is a diol obtained by subjecting tetrahydrofuran to ring-opening polymerization in the presence of a hetero-polyacid catalyst. Illustratively stated, the PTMG is a mixture of polymer chains each independently represented by the following formula (1):

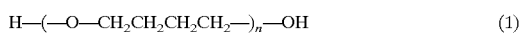

H—(—O—CH$_2$CH$_2$CH$_2$CH$_2$—)$_n$—OH  (1)

wherein, n is independently an integer of from 2 to 4,000, preferably from 2 to 2,100. It should be noted that there is no need for the PTMG molecules to have all molecular weights in the range of from 2 to 4,000 in terms of the value of n.

The PTMG used in the present invention is a PTMG having the following characteristics (1) to (3):

(1) a number average molecular weight of from 500 to 4,000;

(2) a molecular weight distribution of 1.75 or less in terms of the Mw/Mn ratio, wherein Mw represents the weight average molecular weight of PTMG and Mn represents the number average molecular weight of PTMG; and (3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules.

In the present invention, it is important that the PTMG has the above-mentioned specific number average molecular weight, specific molecular weight distribution and specific content of high molecular weight PTMG molecules, and exhibits not only high heat resistance, but also low viscosity. When a polyether polyurethane is produced using such a PTMG, the polyether polyurethane exhibits a good balance of greatly improved properties as compared to that of a polyether polyurethane produced using a conventional PTMG. Illustratively stated, such a polyether polyurethane exhibits high elasticity and elastic recovery, low permanent compression set, and excellent low-temperature characteristics, as compared to those of the conventional polyether polyurethane. Further, when a shaped article is produced from the polyether polyurethane of the present invention, there is no tack on the surface of the produced shaped articles.

From the viewpoint of the balance of flexibility and elastic modulus of the polyether polyurethane produced using the PTMG, the number average molecular weight of the PTMG used in the present invention is in the range of from 500 to 4,000, preferably from 750 to 3,500, more preferably from 800 to 3,500, most preferably from 800 to 3,000. The number average molecular weight of the PTMG can be determined, for example, by gel permeation chromatography (GPC) or by a terminal titration method. In preferred examples of the present invention, however, the number average molecular weight is calculated from the OH value determined by the terminal titration method.

When the number average molecular weight of the PTMG is less than 500, the flexibility of the polyether polyurethane becomes unsatisfactory, and when the number average molecular weight of the PTMG is higher than 4,000, the elastic modulus of the polyether polyurethane becomes unsatisfactory.

The molecular weight distribution of the PTMG used in the present invention is 1.75 or less, preferably 1.15 to 1.75, more preferably 1.15 to 1.70. In the present invention, the molecular weight distribution is defined as the Mw/Mn ratio, wherein Mw represents the weight average molecular weight of the PTMG and Mn represents the number average molecular weight of the PTMG. The Mw and the Mn values can be determined by GPC using the apparatuses and the conditions which are described below in the Examples. When the molecular weight distribution (Mw/Mn ratio) of a PTMG is 1.75 or less, the viscosity of the PTMG is satisfactorily low, and a polyether polyurethane produced using such a PTMG exhibits a good balance of excellent elongation at break and excellent tensile strength at break. On the other hand, when a polyether polyurethane is produced using a PTMG having a molecular weight distribution (Mw/Mn ratio) of more than 1.75, the mechanical properties (such as strength and elongation) of the polyether polyurethane become low. In addition, since the soft segment composed of a PTMG having such a broad molecular weight distribution inevitably contains a large amount of high molecular weight PTMG molecules, the high molecular weight PTMG molecules hinder the phase separation of the soft segment and the hard segment in the polyether polyurethane, thereby causing the low-temperature characteristics of the polyether polyurethane to become poor. Theoretically, the lower limit of the molecular weight distribution is 1.0; however, in practice, it is difficult to produce a PTMG having a molecular weight distribution of less than 1.15.

The PTMG used in the present invention has a content of high molecular weight PTMG molecules of 10% by weight or less, based on the total weight of all PTMG molecules. In the present invention, the "high molecular weight PTMG molecules" are defined as PTMG molecules having molecular weights which are at least six times as large as the number average molecular weight of all PTMG molecules. The PTMG is a mixture of molecules (i.e., polymer chains) having different molecular weights. A PTMG molecule having a molecular weight which is more than six times the number average molecular weight of all PTMG molecules has a melting point which is at least twice as high as that of the mixture of all PTMG molecules. Accordingly, when a large amount of high molecular weight PTMG molecules is contained in the PTMG, the high molecular weight PTMG molecules hinder the phase separation of the soft segment and the hard segment in the polyether polyurethane. In the present invention, the content of high molecular weight PTMG molecules and the molecular weight distribution can be determined by GPC under the following conditions:

Columns: Shodex OH pak SB806M (two columns) and Shodex OH pak SB802.5 (one column) (each manufactured and sold by Showa Denko K.K., Japan);
Detector: Differential refractometer;
Temperature: 60° C.;
Carrier: 0.02 mol/liter solution of LiBr in dimethylacetamide;
Flow rate of the carrier: 1.0 ml/min;
Sample: 100 μl of 0.8% PTMG solution in the carrier; and
Molecular weight standards: PTMG, Mn=547,000 (Mw/Mn=1.35), Mn=283,000 (Mw/Mn=1.08), Mn=99,000 (Mw/Mn=1.08), Mn=67,000 (Mw/Mn=1.04), Mn=35,500 (Mw/Mn=1.06), Mn=15,000 (Mw/Mn=1.09), Mn=6,700 (Mw/Mn=1.13), Mn=2,170 (Mw/Mn=1.12), Mn=1,300 (Mw/Mn=1.12), Mn=650 (Mw/Mn=1.18), and THF monomer.

In the PTMG used in the present invention, the content of high molecular weight PTMG molecules is 10% by weight of less and, thus, the PTMG is in the form of a uniform PTMG mixture having a low viscosity. When such a PTMG is used in the polymerization reaction for producing a polyether polyurethane, a high polymerization rate can be achieved. In addition, the use of such a PTMG is also advantageous in that the obtained polyether polyurethane exhibits high elastic modulus. It is considered that the decrease in the amount of high molecular weight PTMG molecules leads to an improvement in fluidity of the polyether polyurethane and facilitates the formation of a structure in which the phase separation between the hard segment and the soft segment occurs. Further, the ease in formation of such a structure is considered to be increased correlatively with an increase in the ease in formation of spherulites which are considered to be formed by the hard segment.

The high molecular weight PTMG molecules are considered to improve the heat stability of the PTMG as a whole through interaction with low molecular weight PTMG molecules which have high heat decomposability. Therefore, in the present invention, it is preferred that a small amount of high molecular weight PTMG molecules is present in the PTMG used. Specifically, the content of the high molecular weight PTMG molecules is preferably in the range of from 2 to 5% by weight, more preferably 2 to 3.5% by weight, most preferably 2 to 3% by weight. When the content of the high molecular weight PTMG molecules is less than 2% by weight, the above-mentioned effect of the high molecular weight PTMG molecules to improve heat resistance becomes unsatisfactory.

It is preferred that the PTMG used in the present invention has a heteropolyacid content of from 10 to 900 ppb by weight (1 ppb by weight is $1\times10^{-9}$). As mentioned above, the PTMG used in the present invention is obtained by the ring-opening polymerization of tetrahydrofuran in the presence of a heteropolyacid catalyst, and the heteropolyacid contained in the PTMG is the residual polymerization catalyst.

A heteropolyacid is an acid obtained by the condensation of an oxide of at least one metal species selected from the group consisting of molybdenum (Mo), tungsten (W) and vanadium (V), and an oxyacid of at least one element other than mentioned above, such as phosphorus (P), silicon (Si), arsenic (As), germanium (Ge), boron (B), titanium (Ti), cerium (Ce), cobalt (Co) and niobium (Nb). The atomic ratio of the metal species (any one or more of metals selected from the group consisting of Mo, W and V) contained in the heteropolyacid to other elements in the heteropolyacid is 2.5 to 12.

The heteropolyacid contained in the PTMG may be in the form of a salt. Specific examples of heteropolyacids include phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germanotungstic acid, borotungstic acid, boromolybdic acid, boromolybdotungstic acid, boromolybdovanadic acid, boromolybdotungstovanadic acid, cobaltmolybdic acid, cobalttungstic acid, arsenomolybdic acid, arsenotungstic acid, titanomolybdic acid and ceromolybdic acid, and metal salts thereof.

The heteropolyacid content of the PTMG is defined as the total concentration of molybdenum, tungsten and vanadium (ions) which are present in the PTMG. The concentrations of molybdenum, tungsten and vanadium in the PTMG are determined by ICP-Mass spectrometry.

The heteropolyadid content of the PTMG is preferably in the range from 10 to 900 ppb by weight, and the PTMG having a heteropolyacid content within this range exhibits excellent heat stability, and is capable of suppressing depolymerization thereof even at high temperatures. When the heteropolyacid content of the PTMG is less than 10 ppb by weight, the heteropolyacid is incapable of improving the heat stability of the PTMG. On the other hand, when the heteropolyacid content of the PTMG is more than 900 ppb by weight, the produced polyether polyurethane is likely to suffer discoloration at high temperatures. Further, since a part of the heteropolyacid is crystallized to thereby promote depolymerization of the PTMG, the weatherability, light resistance, oxidation resistance and the like of ultimate products obtained from such a polyether polyurethane become low.

For producing the polyether polyurethane of the present invention, it is preferred to use a PTMG which has a low content of oligomers, i.e., tetramer and any smaller oligomers than tetramer. With respect to the structure of the oligomers, linear oligomers and cyclic oligomers are generally present in a PTMG. In a polyether polyurethane, a moiety composed of a linear PTMG oligomer has a chain length and a molecular structure which are intermediate between those of a soft segment (composed of long-chain components) and a hard segment (composed of short-chain components). Such a moiety composed of a linear oligomer may hinder the formation of a structure in which the phase separation between the hard segment and the soft segment occurs. Further, a cyclic oligomer is likely to lower the drying characteristic of a polyether polyurethane coating and such a coating is likely to exhibit tack on the surface thereof.

Hereinbelow, an explanation is made of one example of a method for producing the PTMG used in the present invention.

The PTMG having the above-mentioned specific molecular weight, specific molecular weight distribution and specific content of high molecular weight PTMG molecules can be synthesized in the following manner. The PTMG can be produced by conducting a continuous polymerization reaction in a two-phase system comprising a reaction-formed raw material tetrahydrofuran organic phase containing a polymer and a reaction-formed aqueous tetrahydrofuran/heteropolyacid catalyst phase, while controlling the retention time and the retention time distribution of the monomer (tetrahydrofuran) in the catalyst phase so as to control the molecular weight distribution of the polymer (PTMG).

As an example of a preferred method for producing the PTMG used in the present invention, there can be mentioned a method which comprises a polymerization step (to perform a ring-opening polymerization of tetrahydrofuran to produce the PTMG) conducted using a continuous reactor equipped with a stirrer, and a subsequent step for adjusting the residual heteropolyacid content of the produced PTMG. In the polymerization step for performing a ring-opening polymerization of tetrahydrofuran (hereinafter, referred to simply as "THF") in the presence of a heteropolyacid catalyst, the reaction system comprises the following two phases: a raw material THF organic phase and an aqueous THF/heteropolyacid catalyst phase having a specific gravity of from 1.8 to 2.3. The heteropolyacid is sparingly soluble in an anhydrous THF, but well soluble in a mixed solvent prepared by adding a small amount of water to THF. When a heteropolyacid solution having a specific gravity of from 1.8 to 2.3 which has been prepared by dissolving a heteropolyacid in the mixed solvent of water and THF is added to THF, the resultant reaction system separates into two phases, namely a THF organic phase and an aqueous THF/heteropolyacid catalyst phase (hereinafter, frequently referred to as "aqueous THF/catalyst phases" or simply as "catalyst phase") having a specific gravity of from 1.8 to 2.3. The reason why such a reaction system is obtained is not fully elucidated, but considered to be that a small amount of water is coordinated to the heteropolyacid.

In the polymerization reaction performed in the above-mentioned reaction system comprising a THF organic phase and an aqueous THF/catalyst phase, the molecular weight distribution, especially the content of high molecular weight PTMG molecules, of the produced PTMG can be adjusted by appropriately controlling the rate (F) ($m^3$/hour) of feeding THF to the reactor, the motive power (P) (kW) applied to the liquid in the reactor, the volume (V) ($m^3$) of the liquid in the reactor, and the amount of the heteropolyacid catalyst used. The synthesis of PTMG is conducted by a reaction between a reaction-formed THF organic phase containing a polymer and a reaction-formed aqueous THF/catalyst phase. The reaction system is an emulsion in which the reaction-formed THF organic phase and the reaction-formed aqueous THF/catalyst phase are mutually dispersed in each other both in the form of globules. The polymerization of PTMG is considered to take place in the aqueous THF/catalyst phase. In accordance with the progress of the polymerization reaction, the PTMG dissolved in the aqueous THF/catalyst phase is partitioned between the aqueous THF/catalyst phase and the THF organic phase, and the state of partition reaches an equilibrium under the reaction conditions and becomes stationary. In such a reaction system, when the retention time V/F (hr) of THF (raw material) in the reactor is increased, the retention time distribution of THF in the aqueous THF/catalyst phase becomes broad, and the amount of high molecular weight PTMG molecules increases. Contrary to the above, when the V/F value is decreased, the retention time distribution of THF in the aqueous THF/catalyst phase becomes narrow, and the amount of high molecular weight PTMG molecules decreases. Further, when it is intended to control the molecular weight distribution of the PTMG without varying the number average molecular weight thereof, the amount of heteropolyacid catalyst may be adjusted in accordance with the variation of the V/F value so as to maintain at a constant value the average retention time of THF as viewed per equivalent of the catalyst.

With respect to the motive power P/V (kW/$m^3$) applied to the liquid in the reactor, when the value of P/V is varied, the average particle diameters of globules of the aqueous THF/catalyst phase and the THF organic phase become varied. This variation in the average particle diameters of the globules is considered to result in a variation in the area of contact between the aqueous THF/catalyst phase and the THF organic phase, as well as a variation in the frequency of the coalescence and redivision of the above-mentioned globules, to thereby change the amounts of substances which are moving between the catalyst phase and the organic phase. Specifically, when the P/V value is increased, the amounts of substances which are moving between the catalyst phase and the organic phase become increased, and this increase causes the retention time of the THF monomer molecules in the catalyst phase to become uniform. As a result, it is considered that the retention time distribution of THF in the catalyst phase becomes narrow and the number of high molecular weight PTMG molecules becomes decreased. Contrary to the above, the decrease in the P/V value causes the retention time distribution of THF in the catalyst phase to become broad and causes the number of high molecular weight PTMG molecules to become increased.

A preferred PTMG used in the present invention as the component (B) has a number average molecular weight of from 500 to 3,000, a molecular weight distribution (Mw/Mn) of 1.75 or less, a content of high molecule weight PTMG molecules of from 2 to 5% by weight, and a heteropolyacid content of from 10 to 900 ppb by weight. Following is a method for producing such a preferred PTMG from THF using a heteropolyacid catalyst. In a reaction system where water is present in an amount sufficient to form a THF organic phase and an aqueous THF/catalyst phase having a specific gravity of from 1.8 to 2.3, the retention time (V/F) of THF is maintained within the range of from 0.5 to 20 hours, preferably from 0.7 to 15 hours. When the V/F value is smaller than the above-mentioned range, the conversion of THF is likely to become low. On the other hand, when the V/F value is larger than the above-mentioned range, the reaction time is likely to become long. With respect to the motive power (P/V) applied to the liquid in the reactor, the P/V value is maintained at 1.3 kW/$m^3$ or more, preferably 1.6 kW/$m^3$ or more. When the P/V is smaller than 1.3 kW/$m^3$, the agitation of the reaction system becomes unsatisfactory and the distribution of the diameters of the globules in the reaction system become broad. As a result, the molecular weight distribution of the produced PTMG becomes broad and the control of the molecule weight distribution of the PTMG becomes difficult. By appropriately controlling the V/F and P/V values in the above-mentioned method, it is also possible to obtain a PTMG having a number average molecular weight of more than 3,000 and less than or equal to 4,000, and a content of high molecular weight PTMG molecules of more than 5% by weight and less than or equal to 10% by weight.

The heteropolyacid content of the thus obtained PTMG is adjusted to 10 to 900 ppb by weight to obtain the PTMG used in the present invention. The heteropolyacid content can be adjusted by conventional methods, such as a method disclosed in Unexamined Japanese Patent Application Laid-Open Specification No. 61-118420 (corresponding to U.S. Pat. No. 4,677,231 and EP 181621), Unexamined Japanese Patent Application Laid-Open Specification No. 61-115934 (corresponding to U.S. Pat. No. 4,677,231 and EP 181621), and Unexamined Japanese Patent Application Laid-Open Specification No. 61-123629 (corresponding to U.S. Pat. No. 4,677,231 and EP 181621). However, it is preferred that the heteropolyacid content be adjusted by a method which comprises, for example, the following steps ① to ⑥:

① allowing the reaction mixture obtained in the polymerization step to stand still so as to separate the reaction mixture into a reaction-formed aqueous THF/catalyst phase and a reaction-formed THF organic phase containing PTMG, followed by recovering the THF organic phase containing PTMG;

② distilling off a portion of THF in the recovered THF organic phase, to thereby obtain a PTMG concentrate;

③ adding a saturated hydrocarbon having 5 to 10 carbon atoms to the PTMG concentrate so that a catalyst phase (containing a portion of the heteropolyacid dissolved in the PTMG concentrate) and an organic phase is formed, which are separated from each other by phase separation, and subsequently removing the catalyst phase;

④ subjecting the resultant organic phase to a treatment with an activated carbon and the like so as to remove the heteropolyacid dissolved in the organic phase by adsorption;

⑤ distilling off a portion of the monomer (THF) remaining in the organic phase so that a saturated hydrocarbon phase and a PTMG phase are formed; and ⑥ distilling off oligomers and residual organic solvents (such as THF and saturated hydrocarbon) from the obtained PTMG phase using a thin-film evaporator.

Examples of saturated hydrocarbons used in the operation for adjusting the heteropolyacid content of the PTMG include cyclopentane, cyclohexane, cycloheptane, cyclooctane, cyclononane, cyclodecane, methylcyclopentane, methylcyclohexane, 2-ethylhexane, pentane, hexane, heptane, octane, nonane and decane.

The PTMG used as the component (B) of the polyether polyurethane of the present invention can be in the form of a copolymer, i.e., a copolymer of THF with a monomer other than THF. Examples of comonomers to be copolymerized with THF include 3-methyl-tetrahydrofuran, 1,2-propylene oxide, 3-methyloxetane and the like. There is no particular limitation with respect to the content of comonomer units as long as the comonomer units cause no adverse effects on the properties of the final polyether polyurethane, such as strength, elongation, low-temperature characteristics, flexure resistance, abrasive resistance, elastic recovery, moldability and surface touch. It is preferred that the content of the comonomer units is 20% by weight or less, more advantageously 10% by weight or less, based on the weight of PTMG (B).

The chain extender used as the component (C) of the polyether polyurethane of the present invention is at least one chain extender selected from the group consisting of a $C_2$–$C_{10}$ polyol having two or more hydroxyl groups and $C_2$–$C_{10}$ polyamine having two or more amino groups. The chain extender used in the present invention may also be a compound which functions as a crosslinking agent. Specifically, a chain extender having 3 or more hydroxyl groups or amino groups functions as a crosslinking agent.

The low molecular weight polyol used as the chain extender, is, in a narrow sense, a diol, which has two hydroxyl groups, and such a diol can have a linear or a cyclic configuration. Specific examples of diols include ethylene glycol, 1,3-trimethylene glycol, 1,4-butanediol, 3-methyl-1,4-butanediol, 2,3-butanediol, neopentyl glycol, 1,5-pentamethylene glycol, 2-methylpentamethylene glycol, 3-methylpentamethylene glycol, 1,6-hexamethylene glycol, 1,4-dimethylolcyclohexane, 1.3-dimethylolcyclohexane and 1,2-dimethylolcyclohexane.

The low molecular weight polyol used as the crosslinking agent is a polyol having 3 or more hydroxyl groups, such as an aliphatic polyol and an alicyclic polyol, each having 3 or more hydroxyl groups. Specific examples of polyols having 3 or more hydroxyl groups include trimethylolpropane, glycerin and sorbitol.

The low molecular weight polyamine used as the chain extender, is, in a narrow sense, a diamine, which has two amino groups. Specific examples of diamines include ethylenediamine, hexamethylenediamine, hydrazine, 1,2-propylenediamine, 1,4-butylenediamine, 1,6-hexamethylenediamine, 1,4-cyclohexanediamine, 1,3-cyclohexyldiamine, 4,4'-diaminodiphenylmethane, 4,4'-diaminodicyclohexylmethane, and mixtures thereof.

The low molecular weight polyamine used as the crosslinking agent is a polyamine having 3 or more amino groups. Specific examples of polyamines having 3 or more amino groups include bis(hexamethylene)triamine, 1,3,5-aminomethylcyclohexane and 4-aminomethyloctamethylenediamine.

In the present invention, as the chain extender (C), the above-exemplified low molecular weight polyols and low molecular weight polyamines can be used individually or in combination.

In addition to the above-mentioned components (A), (B) and (C), optional components, such as a high molecular weight polyol other than PTMG, a prepolymer having functional terminal groups and a molecular weight modifier, can be used for synthesizing the polyether polyurethane of the present invention.

Examples of high molecular weight polyols other than PTMG include a polyoxyalkylene diol, a polyester dial, a polycaprolactone diol and a polycarbonate diol.

Examples of prepolymers having functional terminal groups include prepolymers having terminal isocyanate groups which are obtained by modifying the terminals of any of the above-exemplified polyols with a polyisocyanate, and prepolymers obtained by modifying the terminals of any of the above-exemplified polyols with a (meth)acryloyl group or a silyl group.

Examples of molecular weight modifiers include organic amines containing one amino group, such as diethylamine, dimethylamine and dibutylamine.

The polyether polyurethane of the present invention can be produced by conventional urethanation methods, such as a method described in "Poriuretan Jyushi Handobukku (Polyurethane Resin Handbook)", Keiji Iwata ed., Nikkan Kogyo Shimbun Ltd., 1987, and a method described in "Saishin Poriuretan no Kouzou-Bussei to Koukinouka oyobi Ouyoutenkai (Latest report on structures and properties of polyurethane, and improvement in function thereof and development of applications thereof", Technical Information Association, 1999. In general, there are two methods for producing a polyether polyurethane. In the first method, all of the raw materials, such as a polyisocyanate, a high molecular weight polyol and a chain extender, are charged into a reactor at once and a reaction is performed to thereby obtain a polyether polyurethane. In the second method, a first reaction is effected between a polyisocyanate and a high molecular weight polyol to thereby synthesize a prepolymer having terminal isocyanate groups, and then, a second reaction is effected between the synthesized prepolymer and a chain extender to thereby obtain a polyether polyurethane. Both of the above-mentioned methods can be conducted in the absence or presence of a solvent, and when the reaction is performed in the absence of a solvent, the first method is called "one shot method (one-step method)" and the second method is called "prepolymer method (two-step method)".

As a urethanation catalyst for producing the polyether polyurethane of the present invention, any conventional urethanation catalysts, such as a tin compound and a titanium compound, can be used.

In the present invention, the polyether polyurethane is produced using the PTMG having a number average molecular weight, a molecular weight distribution and a content of high molecular weight PTMG which are within the above-mentioned respective specific ranges, and it is preferred that the PTMG has also a hetero polyacid content within the above-mentioned specific range. Unlike the conventional polyether polyurethanes produced using a polyether diol, such as a conventional PTMG, the polyether polyurethane of the present invention has an excellent balance of physical properties. Specifically, the polyether polyurethane of the present invention exhibits excellent properties, such as high elasticity and elastic recovery, low permanent compression set, excellent low-temperature characteristics and high flexibility, as compared to those of the conventional polyether polyurethanes. Further, the polyether polyurethane of the present invention can be used for forming a coating which has no tack on the surface thereof and is unlikely to suffer discoloration. Thus, the polyether polyurethane of the present invention has high utility.

In another aspect of the present invention, there is provided a urethane prepolymer which comprises (A) a polyisocyanate and (B) a PTMG and which has terminal isocyanate groups. The urethane prepolymer of the present invention has either a structure obtained by bonding polyisocyanates to both terminals of a PTMG molecule so that the resultant molecule has terminal isocyanate groups, or a structure obtained by alternately reacting PTMG with a polyisocyanate so as to form an alternating copolymer of PTMG and a polyisocyanate, which has terminal isocyanate groups.

The polyisocyanate used as component (A) of the urethane prepolymer of the present invention is at least one polyisocyanate having two or more isocyanate groups, which is selected from the group consisting of an aromatic polyisocyanate and an aliphatic polyisocyanate. There is no limitation with respect to the number of carbon atoms of the polyisocyanate. For example, the polyisocyanates, which are mentioned above as examples of polyisocyanate (A) of the polyether polyurethane of the present invention, can also be used for producing the urethane prepolymer. Examples of such polyisocyanates include aromatic diisocyanates, the aliphatic diisocyanates, and those which are obtained by modifying these diisocyanates with a polyol or the like can be used.

Specific examples of aromatic diisocyanates include 4,4'-diphenylmethane diisocyanate, 2,4-toluene diisocyanate, 2,6-toluene diisocyanate, 1,4-phenylene diisocyanate, 1,3-phenylene diisocyanate, 1,5-naphthalene diisocyanate and xylylene diisocyanate. As examples of aliphatic diisocyanates, there can be mentioned diisocyanates obtained by hydrogenating the aromatic rings of any of the aromatic diisocyanates exemplified above, hexamethylene diisocyanate, isophorone diisocyanate and 4,4-cyclohexyl diisocyanate.

The PTMG used as component (B) of the urethane prepolymer is a polymeric diol represented by formula (1) above which is obtained by subjecting tetrahydrofuran (THF) to ring-opening polymerization in the presence of a heteropolyacid catalyst. The PTMG used for the urethane prepolymer of the present invention is the same as that used for the polyether polyurethane of the present invention. That is, the PTMG used for the urethane prepolymer of the present invention has the following characteristics (1) to (3):

(1) a number average molecular weight of from 500 to 4,000;
(2) a molecular weight distribution of 1.75 or less in terms of the Mw/Mn ratio, wherein Mw represents the weight average molecular weight of PTMG and Mn represents the number average molecular weight of PTMG; and
(3) a content of high molecular weight PTMG molecules of 10% by weight or less, wherein the high molecular weight PTMG molecules are defined as PTMG molecules having molecular weights which are at least six times as large as the number average molecular weight of all PTMG molecules.

In the present invention, it is important that the PTMG has the above-mentioned specific number average molecular weight, specific molecular weight distribution and specific content of high molecular weight PTMG molecules, and exhibits not only high heat resistance, but also low viscosity. When a urethane prepolymer is synthesized using such a PTMG, and the obtained urethane prepolymer is used for producing a polyether polyurethane, the produced polyether polyurethane exhibits a good balance of greatly improved properties as compared to that of a polyether polyurethane produced using a conventional PTMG. Illustratively stated, a polyether polyurethane produced using the urethane prepolymer of the present invention exhibits high elasticity and elastic recovery, low permanent compression set and excellent low-temperature characteristics as compared to those of the conventional polyether polyurethane. Further, when such a polyether polyurethane is used for producing a shaped article, there is no tack on the surface of the produced shaped article.

The number average molecular weight of the PTMG used for the urethane prepolymer of the present invention is in the range of from 500 to 4,000, preferably from 750 to 3,500, more preferably from 800 to 3,500, most preferably from 800 to 3,000. When the number average molecular weight of the PTMG is outside the above-mentioned range, as described above in connection with the polyether polyurethane of the present invention, various properties of the final polyether polyurethane produced from the urethane prepolymer of the present invention become unsatisfactory.

The molecular weight distribution of the PTMG used for the urethane prepolymer of the present invention is 1.75 or less, preferably 1.15 to 1.75, more preferably 1.15 to 1.70. When the molecular weight distribution of the PTMG is outside the above-mentioned range, as described above in connection with the polyether polyurethane of the present invention, various properties of the final polyether polyurethane produced from the urethane prepolymer of the present invention become unsatisfactory.

The PTMG used for the urethane prepolymer of the present invention has a content of high molecular weight PTMG molecules of 10% by weight or less, preferably 2 to 5% by weight, more preferably 2 to 3.5% by weight, most preferably 2 to 3% by weight, based on the total weight of all PTMG molecules. When the content of high molecular weight PTMG molecules is 10% by weight or less, the PTMG has low viscosity, and a urethane prepolymer produced using such a PTMG also has low viscosity. In addition, such a urethane prepolymer exhibits excellent compatibility with other resins, such as a fluorinated polyol. On the other hand, when the content of the high molecular weight PTMG molecules is more than 10% by weight, as described above in connection with the polyether polyurethane of the present invention, various properties of the final polyether polyurethane produced from the urethane prepolymer of the present invention become unsatisfactory.

Further, it is preferred that the PTMG used for the urethane prepolymer of the present invention has a heteropolyacid content of from 10 to 900 ppb by weight (1 ppb by weight is $1 \times 10^9$). When the heteropolyacid content of the PTMG is outside the above-mentioned range, as described above in connection with the polyether polyurethane of the present invention, various properties of the final polyether polyurethane produced from the urethane prepolymer of the present invention become unsatisfactory.

The PTMG used for producing the urethane prepolymer can be synthesized in accordance with the above-mentioned methods for synthesizing PTMG.

As in the case of the PTMG used for the polyether polyurethane of the present invention, the PTMG (B) used for the urethane prepolymer can be in the form of a copolymer of THF with a monomer other than THF.

The urethane prepolymer of the present invention can be synthesized by the conventional methods, such as a method described in "Poriuretan Jyushi Handobukku (Polyurethane Resin Handbook)", Keiji Iwata ed., Nikkan Kogyo Shimbun Ltd., 1987. For example, a urethane prepolymer having terminal isocyanate groups can be obtained by modifying a PTMG with a polyisocyanate.

The terminal isocyanate groups of the urethane prepolymer of the present invention can be partly or wholly modified so as to have at least one functional group other than an isocyanate group, wherein the functional group is introduced into the terminal isocyanate groups by addition. The functional group introduced into the terminal isocyanate group is a functional group selected from the group consisting of a (meth)acryloyl group and a silyl group. By such modification of the terminal isocyanate groups, it is possible to obtain urethane prepolymers suitable for use in various applications. For example, a urethane prepolymer suitable as a raw material for a photosensitive resin can be obtained by introducing carbon-carbon double bond-containing groups into the terminals of a urethane prepolymer. For example, a carbon-carbon double bond-containing groups can be introduced into the terminals of a urethane prepolymer by reacting the urethane prepolymer having terminal isocyanate groups with a hydroxyalkyl acrylate, a hydroxyalkyl methacrylate, itaconic acid, an acrylate-modified polymeric polyol, a methacrylate-modified polymeric polyol. Specifically, as examples of methods for introducing carbon-carbon double bond-containing terminal groups, there can be mentioned a method in which a urethane prepolymer having terminal isocyanate groups is reacted with an acrylate, such as hydroxymethyl acrylate, so that the terminal isocyanate groups are modified to have an acryloyloxy group: a method in which a urethane prepolymer having terminal isocyanate groups is reacted with a methacrylate, such as hydroxymethyl methacrylate, so that the terminal isocyanate groups are modified to have a methacryloyloxy group; and a method in which a urethane prepolymer having terminal isocyanate groups is reacted with a hydroxyl group-containing polysiloxane, so that the terminal isocyanate groups are modified to have a silyl group.

The urethane prepolymer of the present invention can be widely used as a precursor of a polyether polyurethane. Conventional methods can be used as a urethanation method for obtaining a polyether polyurethane from the urethane prepolymer. Specifically, a polyether polyurethane can be obtained by reacting the urethane prepolymer with a chain extender.

When a polyether polyurethane is synthesized from the urethane prepolymer of the present invention, optional components, such as a polyisocyanate having 2 or more isocyanate groups, a polymeric polyol other than PTMG, a prepolymer having functional terminal groups, a chain extender and a molecular weight modifier, can be used in combination with the urethane prepolymer.

Examples of polyisocyanates having 2 or more isocyanate groups which can be used in combination with the urethane prepolymer of the present invention include an aromatic diisocyanate, an aliphatic diisocyanate, and those which are obtained by modifying these diisocyantes with a polyol or the like.

Specific examples of polyisocyanates include aromatic diisocyanates, such as 4,4'-diphenylmethane diisocyanate, 2,4-toluene diisocyanate, 2,6-toluene diisocyanate, 1,4-phenylene diisocyanate, 1,3-phenylene diisocyanate, 1,5-naphthalene diisocyanate and xylylene diisocyanate; aliphatic diisocyanates, such as diisocyanates obtained by hydrogenating the aromatic rings of any of the aromatic diisocyanates exemplified above, hexamethylene diisocyanate, isophorone diisocyanate, and 4,4-cyclohexyl diisocyanate; and the above-mentioned modified polyisocyanates, such as isocyanurate type polyisocyanate, and blocked polyisocyanates obtained by modifying polyisocyanates with an oxime compound and the like.

With respect to other optional components, such as the high molecular weight polyols other than PTMG, prepolymers having functional terminal groups, chain extenders and molecular weight modifiers, those which can be used for producing the polyether polyurethane of the present invention can also be used.

As an urethanation catalyst used for producing a polyether polyurethane from the urethane prepolymer of the present invention, those which can be used for producing the polyether polyurethane of the present invention can also be used.

In the present invention, the urethane prepolymer is produced using the PTMG which has a number average molecular weight, a molecular weight distribution and a content of high molecular weight PTMG molecules which are within the above-mentioned respective specific ranges, and it is preferred that the PTMG has also a heteropolyacid content within the above-mentioned specific range. Unlike the conventional polyether polyurethane produced using a polyether diol, such as a conventional PTMG, a polyether polyurethane produced using the urethane prepolymer of the present invention has an excellent balance of physical properties. Specifically, such a polyether polyurethane exhibits excellent properties, such as high elasticity and elastic recovery, low permanent compression set, excellent low-temperature characteristics and high flexibility, as compared to those of the conventional polyether polyurethanes. Further, such a polyether polyurethane can be used for forming a coating which has no tack on the surface thereof and is unlikely to suffer discoloration. Thus, the urethane prepolymer of the present invention has high utility. Further, when a composition, such as a coating composition, is prepared using the urethane prepolymer of the present invention, the prepared composition also exhibits excellent properties (such as excellent fluidity before curing, excellent drying characteristic, and capability of forming a coating having no surface tack).

By utilizing the above-mentioned excellent balance of various properties, the polyether polyurethane and urethane prepolymer of the present invention can be used in the various application fields mentioned below.

The polyether polyurethane of the present invention and a polyether polyurethane produced from the urethane prepolymer of the present invention can be used as a material for a flexible foam. For example, the flexible foam can be used for producing automobile parts, such as a cushion, a ceiling material, an inner material of a door trim, a padding, a sun visor, a cushioning for a floor, a waterproofing material for a car cooler, a damper and an air sealing material. The flexible foam can also be used for producing beddings, such as a mattress, a Japanese futon (bed quilt), a matress for a Japanese kotatsu (foot warmer), a pillow and the like: sponges for dish washing; sponges for washing bodies; powder puffs; inner linings of shoes; slippers; and clothes. The flexible foam can also be used for producing parts of electric and electronic equipments, such as a filter of an air conditioner, a sound absorption material, a heat insulation material, a material for producing an edge of a speaker, and a sound absorption material of a printer. Further, in the fields related to packings, the flexible foam can be used as a cushioning material, a packaging material, and an electrical conductive packaging material. In addition, the flexible foam can be used for producing various articles used in the fields related to clinical equipments; sealing materials, sound absorption materials and heat insulation materials which are used for civil engineering and construction; and highly air permeable foams for hydroponics.

The polyether polyurethane of the present invention and a polyether polyurethane produced from the urethane prepolymer of the present invention can also be used as a material for a flexible molded foam. For example, the flexible molded foam can be used for producing a cushioning of an automobile, a seat of an automobile, an underlayment of a carpet, a packing for a carpet and a floor material for an automobile.

The polyether polyurethane of the present invention and a polyether polyurethane produced from the urethane prepolymer of the present invention can also be used as a material for a semirigid foam. For example, the semirigid foam can be used for producing interior automobile trims, such as a dashboard, a headrest, an armrest, a kneepad, a pillar pad, a console box, a sun visor, a floor mat, a horn pad, an ashtray, a handle wheel and a door panel; and exterior automobile trims, such as a bumper, a fender and a sound insulation material for a tire housing.

The polyether polyurethane of the present invention and a polyether polyurethane produced from the urethane prepolymer of the present invention can also be used as a material for a rigid foam. For example, the rigid foam can be used for producing parts used in the fields related to ocean engineering, such as a heat insulation material for a pantry, a freezer, a container and a tank of a ship; a core material of an FRP (fiber reinforced plastic) board; a floatation material of a lifeboat; a floating dock for a target boat and a large ship; a buoy and a float. In addition, the rigid foam can also be used for producing a heat insulation material for a pantry, a freezer, a container and a tank, which are attached to an automobile; and a heat insulation material for a ceiling of vehicles, such as a train. Further, in industrial plants, the rigid foam can also be used for a heat insulation material of tanks and pipes, a lagging material or low-temperature insulation material of a tank, a cover for heat insulation, a lid of a tank and the like. The rigid foam can also be used for a heat insulation material for a household refrigerator or air conditioner, a heat insulation material for a showcase type storage, a vending machine, a water heater, a hot well and the like. In addition, the rigid foam can also be used as construction materials, such as a core material of a panel; a siding material; a heat insulation material for a bath-tub, a freezing storage, a refrigerating storage, an isothermal storage, an agricultural storage and a shed; a heat insulation material for a central heating; a heat insulation material for a roof; a material for preventing house dew condensation (which is, for example, used for a ceiling, an inner wall or used under the floor); a heat insulation material for the roadbed and an antivibration material. In the field related to furnitures, interior and the like, the rigid foam can be used as a material for a core material of a chair, a door panel, decorations and craft works, a plaything, a cool box, a canteen, a teaching material, a three dimensional map, a shaping material, a heat insulation material of a sash, a core material for a ski, a housing, a wrapping and the like.

The polyether polyurethane of the present invention and a polyether polyurethane produced from the urethane prepolymer of the present invention can also be used as a material for flexible RIM (Reaction Injection Molding) articles. Examples of the flexible RIM articles include automobile parts, such as a bumper, a facer, a fender, an air spoiler, a door panel, a rear, lower quarter panel, a front hood, a cover of a headlamp, a roof, a lid of a rear deck, a rear, upper quarter panel, a steering wheel, a crush pad, a headrest, a console box and a pillar. Further examples of the flexible RIM articles include a shoe sole and an armrest of a furniture.

The polyether polyurethane of the present invention and a polyether polyurethane produced from the urethane prepolymer of the present invention can also be used as a material for rigid RIM articles. Examples of the rigid RIM articles include electrical equipments, such as cabinets of a television, a radio and a stereo; a drainage receiver of an air conditioner; a speaker cabinet; a casing of a player; a screen; a door frame of a refrigerator; a center desk of a telephone; a casing of a telephone exchanger; a switch box; a covering for an input port of a cable; and a box for branched cables. Examples of the rigid RIM articles used for office appliances include a desk, a chair, a casing of a cabinet, a housing of a copying machine, a housing of a computer, a housing of a word processor and a box for medicines. Examples of the rigid RIM articles used in the fields related to vehicles and transport equipments include a container for meals served on airplanes, a cabinet of a car air conditioner, a back of an airplane seat, a casing of a battery, parts of agricultural appliances and construction appliances, a pallet, a door of an automobile, a cover of an equipment, and a filter. Further examples of the rigid RIM articles include sports articles and leisure articles, such as-a core material of skis, an inner sole, a racket, a rudder of a yacht, an oar of a boat, a sleigh, a sleigh with rollers, a game machine, a musical instrument and a movable comb hive; and the building materials and daily commodities, such as a window frame, a frame of a lighting window, an exhaust vent, a drainage, a washstand and a dressing table, a frame of a mirror, a fake wood carving, an imitation of an old wood, a chair, a desk, a fence, a coat hanger, a kitchen unit and a vase.

The polyether polyurethane and urethane prepolymer of the present invention can also be used for a cast polyurethane elastomer. For example, the cast polyurethane elastomer can be used as a material for rolls, such as a pressure roll, a paper-making roll, a roll for office appliances and a platen roll; solid tires or casters of a fork lift truck, a vehicle of a new-tram, a cart and a truck; industrial products, such as an idler roller of a conveyor belt, a guide roll, a pulley, a lining of a steel tube, a rubber screen for an ore, a gear, a connection ring, a liner, an impeller of a pump, a cyclone cone and a cyclone liner. Further, the cast polyurethane elastomer can also be used for producing a belt of an office automation machine, a roll for feeding paper, a squeegee, a cleaning blade of a copying machine, a snowplow, a toothed belt, a surf roller and the like.

The polyether polyurethane of the present invention and a polyether polyurethane produced from the urethane prepolymer of the present invention can also be used for the thermoplastic elastomer. For example, in the fields related to food industries and clinical equipments, the thermoplastic elastomer can be used as a material for tubes and hoses for a pneumatic instrument, a coating apparatus, an analytical instrument, a physicochemical instrument, a metering pump, a water treatment apparatus and an industrial robot; spiral tubes; fire hoses and the like. The thermoplastic elastomer can also be used for producing belts, such as a round belt, a V-belt and a flat belt which are used in various driving mechanisms, spinning machines, packaging machines, printing machines and the like. Further, examples of injection molded articles of the thermoplastic elastomer include heel tops of shoes and soles of sports shoes; machine parts, such as a coupling, a packing, a ball joint, a bushing, a gear and a roll; sports articles; leisure articles; and belts of digital watches. Examples of automobile parts produced from the thermoplastic elastomer include an oil stopper, a gearbox, a spacer, a chassis part, an interior trim and a substitute for a tire chain. In addition, a film for a keyboard, a covering for a keyboard, a film for an automobile sheet, a curled cord, a cable sheath, a bellows, a conveyance belt, a flexible container, a binder, a synthetic leather, a dipped article, an adhesive and the like can be produced using the thermoplastic elastomer.

The polyether polyurethane of the present invention and a polyether polyurethane produced from the urethane prepolymer of the present invention can also be used for a kneaded elastomer. For example, the kneaded elastomer can be used as a material for a belt for moving small articles, parts of a small article, an O-ring, a bushing, a coupling, an oil seal, a dust cover of an automobile, a stopper and an impeller. The polyether polyurethane of the present invention and a polyether polyurethane produced from the urethane prepolymer of the present invention can be used for a sprayed elastomer and a low-temperature curing elastomer which can be used for producing linings of a bed of a truck, linings of a hopper of a mixermobile, coatings of a floor, tracks used for athletic competitions, gaskets of a large pipe, sealing materials and the like.

The polyether polyurethane of the present invention and a polyether polyurethane produced from the urethane prepolymer of the present invention can be used as a material for a solvent type two-pack coating composition. Such a solvent type two-pack coating composition can be used on wooden articles, such as a musical instrument, a household Buddhist altar, a furniture, a decorating plywood and a sports article. The polyether polyurethane can also be used as a material for producing a tar epoxy urethane for repairing automobiles. The polyether polyurethane can also be used as a material for a non-solvent type two-pack coating composition, such as a tar urethane.

The polyether polyurethane of the present invention and a polyether polyurethane produced from the urethane prepolymer of the present invention can also be used as a component for coating compositions, such as a moisture curing type one-pack coating composition; a solvent type coating composition containing a blocked isocyanate; an aqueous coating composition containing a blocked isocyanate; a powdery coating composition; a urethane alkyd resin coating composition; a urethane-modified synthetic resin coating composition and an UV curing type coating composition, and specific examples of such coating compositions include a coating composition for a plastic bumper; a strippable paint; a coating agent for a magnetic tape; an overprint varnish for a floor tile, a floor material, a paper and a vinyl film with wood grain printing; a varnish for wood; a coil coating for highly processed materials; a protective coating for optical fibers; a solder resist; a top coat for metal printing; a base coat for deposition; a white coating for cans used for food.

The polyether polyurethane and the urethane prepnmer of the present invention have low viscosity, and when a two-pack coating composition is produced using the polyether polyurethane or the urethane prepolymer, the produced two-pack coating composition exhibits low viscosity even immediately after mixing the two components of the two-pack coating composition. Thus, the polyether polyurethane and the urethane prepolymer of the present invention are suitable as materials for producing a high solid type coating.

The polyether polyurethane of the present invention and a polyether polyurethane produced from the urethane prepolymer of the present invention can also be used as an adhesive in the fields of a package for food, a shoe, a footwear, a binder for magnetic tapes, a decorative paper, a wood, a structural material and the like. Further, the polyurethane can also be used as a component for an adhesive for use at very low temperatures and also as a component for a hot melt.

The polyether polyurethane of the present invention and a polyether polyurethane produced from the urethane prepolymer of the present invention can be used as a binder for a magnetic recording medium, an ink, a casting, a calcined brick, a grout, a micro-capsule, a granular fertilizer, a granular pesticide, a polymer cement mortar, a resin mortar, a rubber chip, a recycled foam, a sizing agent for glass fibers and the like.

The polyether polyurethane of the present invention and a polyether polyurethane produced from the urethane prepolymer of the present invention can also be used as a component of fiber processing agents to be used for an anti-shrink treatment, a crease resistant finish, a water repellency-imparting treatment and the like.

The polyether polyurethane of the present invention and a polyether polyurethane produced from the urethane prepolymer of the present invention can also be used as a sealant or a caurking for a concreted wall, an induced joint, a gap around a sash frame, a wall type PC joint, an ALC joint, a joint of boards, a sealant for a composite glass, a sealant for a heat insulation sash, a sealant for an automobile and the like.

The polyether polyurethane of the present invention and a polyether polyurethane produced from the urethane prepolymer of the present invention can also be used as a material for clinical equipments. For example, the polyether polyurethane can be used as a blood compatible material for tubes, catheters, artificial hearts, artificial vessels, artificial valves and the like, and as a disposable material for catheters, tubes, bags and a potting material of an artificial kidney.

After modifying the terminals of the urethane prepolymer, the urethane prepolymer of the present invention can be used as a raw material for an UV curing type coating composition, an electron radiation curing type coating composition, a photosensitive resin composition for flexographic printing plate, a photo-setting type coating composition for optical fibers and the like.

The uses of the polyether polyurethane of the present invention, the urethane prepolymer of the present invention and a polyether polyurethane produced from the urethane prepolymer of the present invention are exemplified above, but they should not be construed as limiting the uses of the products of the present invention.

BEST MODE FOR CARRYING OUT THE INVENTION

Hereinbelow, the present invention will be described in more detail with reference to the following Reference Examples, Examples and Comparative Examples, but they should not be construed as limiting the scope of the present invention.

Polyoxytetramethylene glycols. (hereinafter, polyoxytetramethylene glycol is frequently referred to as "PTMG") used in the Examples and the Comparative Examples were synthesized in accordance with the following Reference Examples.

Reference Example 1

PTMG was produced using the production system shown in FIG. 1.

First, a heteropolyacid catalyst solution for use as a polymerization catalyst was produced as follows. A 2-liter reaction vessel was prepared, which is provided with a 3-way cock having three respective ends, wherein each end has attached thereto a condenser and an eggplant type flask for collecting and storing a distillate produced by the condenser, so that the contents of the reaction vessel can be distilled. The thus prepared reaction vessel was used for producing a heteropolyacid catalyst solution. 1 liter of tetrahydrofuran (THF) and 600 g of silicotungstic acid dodecahydrate were introduced into the reaction vessel in this order, and stirred at 60° C., while continuously removing an azeotropic vapor of water and THF from the reaction vessel. The specific gravity of a solution being formed in the reaction vessel was periodically measured while feeding THF to the reaction vessel every 10 minutes so as to compensate for the total amount of water and THF removed from the reaction vessel. When the specific gravity of the solution became 2.07, the reaction was terminated to thereby obtain a catalyst solution having a specific gravity of 2.07, namely a solution of heteropolyacid catalyst in a THF/water mixture.

Next, polyoxytetramethylene glycol was produced by the following operation. Reactor 2 having a capacity of 500 ml was equipped with stirrer 1 and a reflux condenser. 180 ml of the above-obtained catalyst solution (CS) was charged into reactor 2 and 240 ml of THF (monomer) was added thereto to thereby obtain a reaction system comprised of a THF organic phase and an aqueous THF/catalyst phase. The obtained reaction system was stirred at 60° C. while maintaining the motive power (P/V) applied to the liquid per unit volume of the reactor at 1.95 kW/m$^3$ and while feeding THF to reactor 2 at a rate of 64 ml/hour, to thereby obtain a polymerization reaction mixture comprising a reaction-formed THF organic phase containing a polyoxytetramethylene glycol and a reaction-formed aqueous THF/catalyst phase. The retention time (V/F) of THF in reactor 2 was 6.6 hours. During the reaction, water was fed to reactor 2 from water feeding tank 3 so as to maintain the specific gravity of the aqueous THF/catalyst phase at 2.07. A part of the polymerization reaction mixture was transferred into first, phase-separation vessel 4, thereby separating the reaction mixture into two phases, namely an upper reaction-formed THF organic phase containing a polyoxytetramethylene glycol and a lower reaction-formed aqueous THF/catalyst phase. The upper phase was withdrawn from first, phase-separation vessel 4 at a rate which is the same as the rate of the feeding of THF, while the lower reaction-formed aqueous THF/catalyst phase (CP) was recycled to reactor 2.

The upper phase withdrawn from first, phase-separation vessel 4 (i.e., the reaction-formed THF organic phase containing polyoxytetramethylene glycol) was fed into distillation vessel 5 for removing unreacted THF. The THF concentration of the organic phase was adjusted to 45 to 50 t by weight, thereby obtaining a polyoxytetramethylene glycol concentrate.

The above-mentioned operation for obtaining a polyoxytetramethylene glycol was continuously performed for 50 hours. 100 g of the polyoxytetramethylene glycol concentrate produced during the stable operation of the reactor was subjected to the following operations for adjusting the heteropolyacid content of the polyoxytetramethylene glycol.

100 g of the polyoxytetramethylene glycol concentrate was fed into second, phase-separation vessel 6. 120 g of n-octane (solvent, S) was added to second, phase-separation vessel 6 and stirred for 5 minutes at room temperature, thereby obtaining a mixture. The obtained mixture was allowed to stand still for approximately 5 minutes, so that the mixture was separated into a lower aqueous THF/heteropolyacid catalyst phase (CP) and an upper organic phase. 200 g of the upper organic phase which is a solution containing polyoxytetramethylene glycol was placed in a 500 ml eggplant type flask which was warmed in a water bath maintained at 50° C. Subsequently, the solution was applied to adsorption column 7 at a rate of 100 g/hour using a pump. Adsorption column 7 was a column packed with 1 kg of an activated carbon (AC) and the column had an outer jacket in which water heated to 45° C. was circulated so as to maintain the inner temperature of adsorption column 7 at 40° C. or higher.

An eluate (approximately 200 g) obtained from adsorption column 7 was placed in a 300 ml eggplant type flask heated in an oil bath maintained at 100° C. The eggplant type flask was equipped with Oldershaw distillation column 8 (number of theoretical plates: 10). The eluate in the eggplant type flask was subjected to distillation under atmospheric pressure with stirring to thereby remove THF in the eluate. The residual solution in the flask was transferred to a 300 ml separation funnel used as third, phase-separation vessel 9. In third, phase-separation vessel 9, the solution was allowed to separate into two phases, namely a phase containing polyoxytetramethylene glycol as a main component and a phase containing n-octane (S) as a main component. The lower phase (approximately 30 g) containing polyoxytetramethylene glycol was taken out from third, phase-separation vessel 9 and subjected to vacuum distillation in vacuum distillation vessel 10 for 20 minutes at 100° C. under a reduced pressure of not more than 0.1 Torr. Low-boiling point substances (LBPS), such as n-octane, THF and oligomers, were distilled off to thereby obtain PTMG (A). The obtained PTMG (A) was approximately 23 g.

The obtained PTMG (A) had a number average molecular weight (Mn) of 1840, a molecular weight distribution (Mw/Mn) of 1.60, and a content of high molecular weight PTMG molecules which are at least six times as large as the number average molecular weight of all PTMG molecules (hereinafter, simply referred to as "content of high molecular weight PTMG molecules") of 2.29% by weight. The number average molecular weight was determined by the terminal titration method, and the molecular weight distribution and the content of high molecular weight PTMG molecules were determined by gel permeation chromatography (GPC) under the conditions mentioned below.

Figure 2:
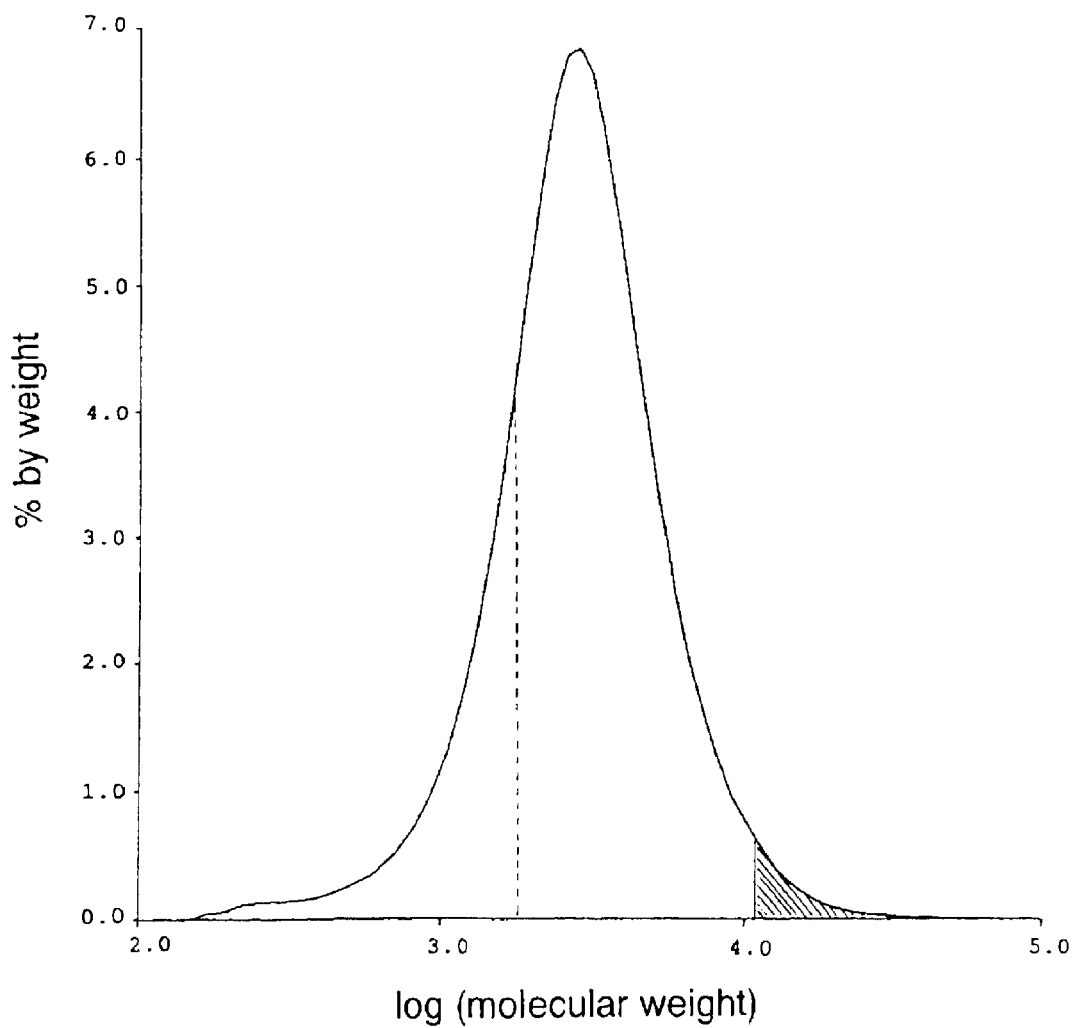
FIG. 2 is a chromatogram of PTMG (A) produced in Reference Example 1, which shows the molecular weight distribution of PTMG (A), wherein the abscissa shows the logarithm (log) of the molecular weight, the ordinate shows the weight % of component PTMG molecules, based on the total weight of all PTMG molecules, the intersection of the vertical straight broken line and the abscissa shows the logarithm of the number average molecular weight, and the area of the hatched portion shows the amount of the PTMG molecules having molecular weights which are at least six times as large as the number average molecular weight of all PTMG molecules.

A chromatogram of PTMG (A) which shows the molecular weight distribution of PTMG (A) is shown in FIG. 2. In FIG. 2, the abscissa shows the logarithm (log) of the molecular weight; the ordinate shows the weight % of component PTMG molecule, based on the total weight of all PTMG molecules; and the intersection of the vertical straight broken line and the abscissa shows the logarithm of the number average molecular weight. The area of a hatched portion shows the amount of the PTMG molecules having molecular weights (11,040 or more; log (molecular weight)= 4.04 or more), which are at least six times as large as the number average molecular weight (Mn=1,840; log Mn=3.26) of all PTMG molecules. The ratio of the area of the hatched portion to the total area of the peak is 2.29%.

The heteropolyacid content of the obtained PTMG was determined by ICP-Mass spectrometry in terms of the tungsten (W) content, and found to be 270 ppb by weight.

In the present invention, the terminal titration method, GPC, ICP-Mass spectrometry and determination of E-type viscosity were individually conducted under the following conditions.

Terminal Titration Method

The terminal titration method was conducted in accordance with the method described at page 353 of "Bunseki Kagaku Benran (Handbook of Analytical Chemistry)", Revised 3rd edition, Japanese Society of Analytical Chemistry ed., in which anhydrous acetic acid and pyridine are used.

Conditions for GPC Analysis

GPC apparatus: Shodex GPC system-11 (manufactured and sold by Showa Denko K. K., Japan)
Columns: Shodex OH pak (manufactured and sold by Showa Denko K. K., Japan):
SB 806 M (2 columns)
SB 802.5 (1 column)
Detector: Differential refractometer
Column temperature: 60° C.
Carrier (eluent): 0.02 mol/liter LiBr solution of dimethylacetamide
Flow rate of carrier: 1.0 ml/min
Sample: 100 μl of 0.8% PTMG solution in the carrier
Molecular weight standards: PTMG, Mn=547,000 (Mw/Mn=1.35), Mn=283,000 (Mw/Mn=1.08), Mn=99,000 (Mw/Mn=1.08), Mn=67,000 (Mw/Mn=1.04), Mn=35,500 (Mw/Mn=1.06), Mn=15,000 (Mw/Mn=1.09), Mn=6,700 (Mw/Mn=1.13), Mn=2,170 (Mw/Mn=1.12), Mn=1,300 (Mw/Mn=1.12), Mn=650 (Mw/Mn=1.18), and THF monomer.

Conditions for ICP-Mass Spectrometry

Approximately 5 g of a sample PTMG was heated in a quartz crucible to thereby calcine the sample PTMG. To the calcined PTMG was added 2 ml of 35% hydrochloric acid solution. Then, the resultant mixture was heated to decompose the calcined PTMG. To the decomposed PTMG was added 0.1 ml of an aqueous 1 ppm indium (In) solution as an internal standard and then added water in an amount such that the final volume of the resultant solution became 25 ml, to thereby obtain a sample PTMG solution. The obtained sample PTMG solution was subjected to ICP-Mass spectrometry using PQΩ-type ICP-MS (manufactured and sold by VG Elemental, England). The heteropolyacid content of PTMG was determined as the tungsten content of the PTMG using a calibration curve for tungsten (W).

The calibration curve used for determining the tungsten content was prepared using standard tungsten solutions which contained tungsten in various concentrations (5 to 10,000 ppb by weight). The standard tungsten solutions were prepared by adding 0.1 ml of an aqueous 1 ppm indium (In) solution as an internal standard to each of tungsten solutions (in 35% hydrochloric acid solution) having various concentrations, and adding water thereto so that the final volume of the resultant solution becomes 25 ml.

| E-type viscosity | |
| --- | --- |
| Apparatuses: | E-type viscometer (Controller E2, manufactured and sold by TOKIMEC, Japan) and circulating constant-temperature bath (VCH-4, manufactured and sold by TOKIMEC, Japan) |
| Temperature: | 40° C. |
| Revolution of rotor: | 20 rpm |

Reference Example 2

PTMG (B) was produced in substantially the same manner as in Reference Example 1, except that 80 ml of a phosphomolybdic acid solution having a specific gravity of 1.8 was used as a catalyst solution, the initial amount of THF charged in the reactor was 340 ml, the rate of feeding of THF was 42 ml/hr, the V/F value of THF in the reactor was 10 hours, and the P/V value was 2.3 kW/m³.

The produced PTMG (B) had a number average molecular weight of 870, a molecular weight distribution of 1.70, a content of high molecular weight PTMG molecules of 4;35% by weight, and a heteropolyacid content of 320 ppb by weight.

Besides the PTMG's produced by the Reference Examples above, the below-mentioned commercially available PTMG's were purchased and used in the Comparative Examples. The number average molecular weights, the molecular weight distributions, the contents of high molecular weight PTMG molecules, the heteropolyacid contents and the viscosities of the commercially available PTMG's were determined in the above-mentioned manner, and are shown in Table 1.

PTMG (E): "Polytetramethylene glycol PTG 2000", manufactured and sold by Hodogaya Chemical Co., Ltd., Japan
PTMG (F): "Polytetramethylene glycol PTG 1000", manufactured and sold by Hodogaya Chemical Co., Ltd., Japan
PTMG (G): Polytetramethylene ether glycol 1000, manufactured and sold by BASF AG, Germany
PTMG (K): Polytetramethylene ether glycol 2000, manufactured and sold by BASF AG, Germany PTMG (L): Polytetramethylene ether glycol 2000, manufactured and sold by Du Pont, USA
PTMG (M): Polytetramethylene ether glycol 2000, manufactured and sold by Mitsubishi Chemical Corporation, Japan
PTMG (P): Polytetramethylene ether glycol 1000, manufactured and sold by Mitsubishi Chemical Corporation, Japan Internal standard: nitrobenzene; and
Sample: 10% urethane prepolymer solution in ethyl acetate.

③ Drying Characteristic

The drying characteristic was evaluated in accordance with JIS K5400 by touching the test specimens with fingers. The test specimens which were relatively dry as compared

TABLE 1

| | Characteristics of PTMG's | | | | | | | | |
|---|---|---|---|---|---|---|---|---|---|
| PTMG | A | B | E (purchased product) | F (purchased product) | G (purchased product) | K (purchased product) | L (purchased product) | N (purchased product) | P (purchased product) |
| Number average molecular weight (Mn) | 1840 | 870 | 1897 | 925 | 1038 | 1881 | 1841 | 1799 | 963 |
| Molecular weight distribution (Mw/Mn) | 1.60 | 1.70 | 2.51 | 1.78 | 1.87 | 2.44 | 2.47 | 2.53 | 2.07 |
| Content of high molecular weight PTMG molecules (% by weight) | 2.29 | 4.35 | 13.39 | 3.78 | 5.21 | 10.85 | 11.62 | 13.39 | 7.01 |
| Heteropolyacid content (ppb by weight) | 270 | 320 | 0 | 7 | 80 | 22 | 0 | 0 | 0 |
| Viscosity (cP) | 630 | 242 | 1345 | 269 | 287 | 1175 | 1257 | 1182 | 327 |
| Number of functional groups | 2 | 2 | 2 | 2 | 2 | 2 | 2 | 2 | 2 |

In the Examples and the Comparative Examples, various properties of the polyether polyurethane and the urethane prepolymer produced were evaluated and measured by the following methods.

① NCO Group Content

The isocyanate (NCO) group content (% by weight) of the urethane prepolymer was measured by the amine equivalent method. Specifically, an excess amount of n-dibutylamine was added to the urethane prepolymer, to thereby completely react the isocyanate groups contained in the urethane prepolymer with n-dibutylamine. After the termination of the reaction, the amount of unreacted n-dibutylamine contained in the reaction mixture was determined by back titration using hydrochloric acid/methanol for determining the NCO group content of the urethane prepolymer.

② HDI Concentration

The hexamethylene diisocyanate (HDI) concentration (% by weight) of the urethane prepolymer is the ratio of unreacted HDI remaining in the urethane prepolymer. The HDI content was measured by gas chromatography under the following conditions:
Apparatus: GC-8AFID (manufactured and sold by Shimadzu Corporation, Japan);
Column: 1 m glass packed column;
Filler: Silicon OV-17;
Column temperature: 120° C.;
Carrier gas: 40 to 60 ml/min of nitrogen;
Injection temperature: 170° C.;
FID (detector) temperature: 170° C.;
Amount of the injected sample: 0.8 µl;

to other test specimens were evaluated as having good drying characteristic.

④ Hardness

'A' hardness was measured in accordance with JIS K6301.

⑤ Elongation at Break and Tensile Strength at Break

Elongation at break and tensile strength at break were measured in accordance with JIS K6301 (using a dumbbell No. 3 prescribed therein) or JIS K6254.

⑥ Dunlop Impact Resilience Dunlop impact resilience was measured in accordance with BS 903 at room temperature.

⑦ Viscoelasticity Index

The viscoelasticity index was obtained in terms of the value of $2C_1$ which is the primary approximate aspect of the contributions of chemical crosslinkages and permanent entanglements of polyurethane molecules to the elasticity of a polyurethane. The $2C_1$ value was calculated in accordance with the Mooney-Rivlin formula below:

$$\sigma = 2C_1(\alpha - \alpha^{-2}) + 2C_2(1 - \alpha^{-3})$$

wherein α represents the elongation ratio, σ represents the normal stress, and $2C_2$ represents the contribution of the physical crosslinkage to the elasticity of the polyether polyurethane.

Figure 3:
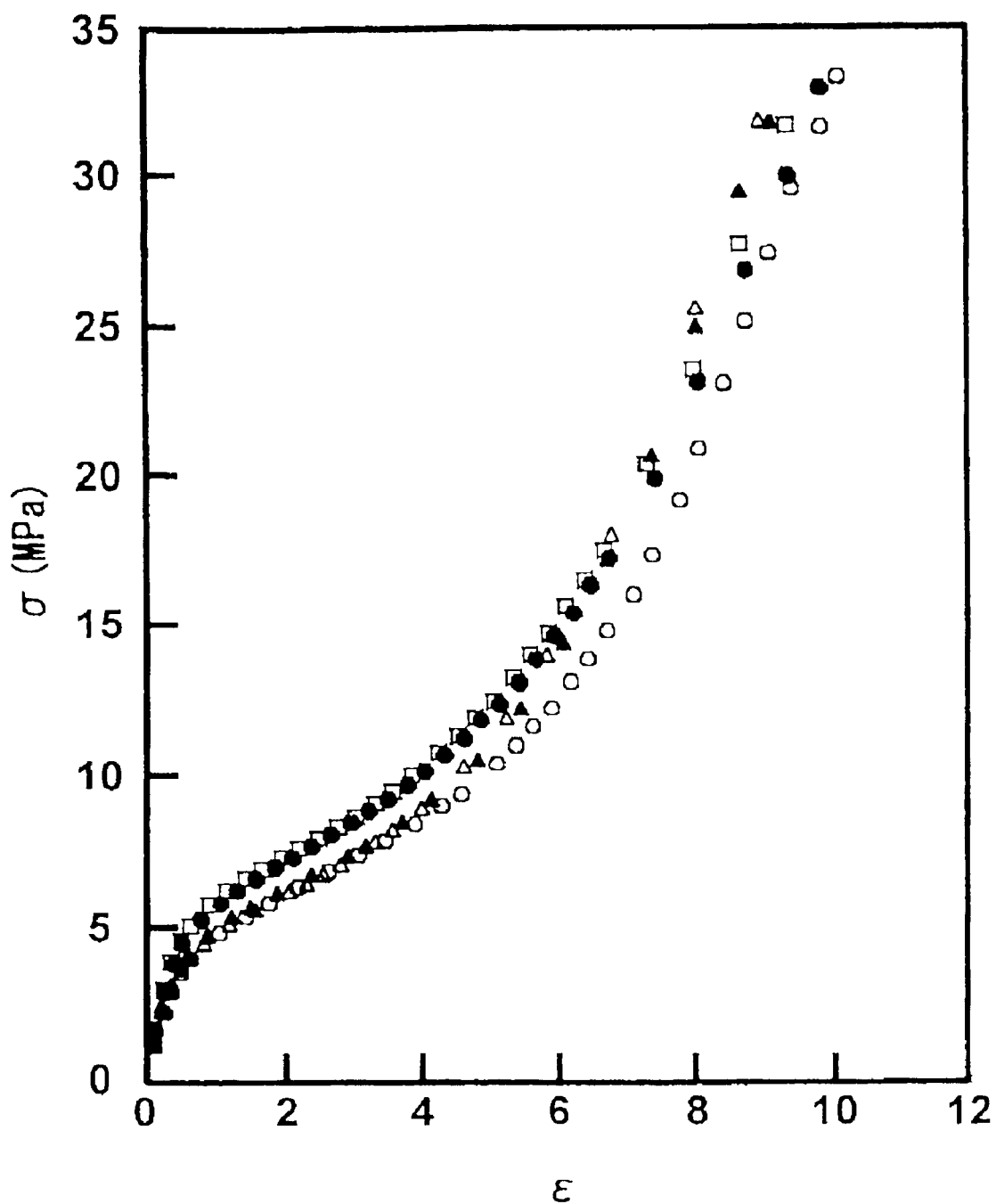
FIG. 3 is a graph showing the stress-strain curves of polyether polyurethanes, wherein each ○ represents the polyether polyurethane produced in Example 6, each Δ represents the polyether polyurethane produced in Comparative Example B, each ☐ represents the polyether polyurethane produced in Comparative Example 9, each ● represents the polyether polyurethane produced in Comparative Example 10, and each ▼ represents the polyether polyurethane produced in Comparative Example 11.

Specifically, the elongation (ε) and normal stress (σ, the load per initial crosssectional area) of the polyether polyurethane were measured in accordance with JIS K6254 (wherein a polyether polyurethane strip having a width of 5 mm and a thickness of 2 mm was used as a test specimen, the distance between chucks was 30 mm and the rate of elongation was 10 mm/min (33.33%/min)), thereby obtaining a graph shown in FIG. 3. Using the obtained graph, the value for σ was determined from the ordinate of the graph and the value for α was determined in accordance with the following relationship: α=ε+1 by using the ε value obtained from the abscissa of the graph. Using elongation ratio α and normal stress σ obtained above, σ/(α-α$^{-2}$) values were plotted against 1/α values, and from intercept of the plotted curve was obtained the 2C$_1$ value.

⑧ Storage Elastic Modulus and Loss Elastic Modulus (Dynamic Viscoelasticity)

Using a test specimen having a length of 15 mm, a width of 4 mm and a thickness of 2 mm, storage elastic modulus (E') and loss elastic modulus (E") of the polyether polyurethane were measured using a measuring apparatus (Direct-reading type RHEOVIBRON (DDV-IIC type), manufactured and sold by ORIENTEC CORPORATION, Japan) under conditions wherein the frequency was 110 Hz and the temperature was -150° C. to 250° C. In addition, the dissipation factor (tan δ, a ratio of loss elastic modulus to storage elastic modulus) was determined from the obtained data.

⑨ Observation Under Polarization Microscope

An ultra thin piece of polyether polyurethane was cut out from a sheet of the polyether polyurethane, and the piece of polyether polyurethane was observed under a polarization microscope (OPTIPHOTO2-POL, manufactured and sold by NIKON CORP., Japan) using crossed Nicols. Further, a sensible color plate was inserted into the polarization microscope, and the orientation of spherulites of the polyether polyurethane was observed.

EXAMPLE 1

A 2-liter flask provided with a thermometer, a refrigerator and a stirrer was charged with 616 g of hexamethylene diisocyanate (HDI) and 450 g of PTMG (A), thereby obtaining a mixture (NCO group/OH group molar ratio of the obtained mixture=15). A reaction was performed at 100° C. for 1 hour with stirring. The reaction mixture was subjected to distillation at 160° C. under a vacuum degree of 0.2 mHg by means of a thin film evaporator to remove unreacted HDI from the reaction mixture, thereby obtaining 525 g of urethane prepolymer PA. The obtained urethane prepolymer PA had an NCO group content of 3.8% by weight and an HDI concentration of 0.1% by weight. When urethane prepolymer PA was observed by visual observation, the fluidity of urethane prepolymer PA was excellent. The amounts of raw materials charged to the flask for preparing urethane prepolymer PA and the properties of urethane prepolymer PA are shown in Table 2.

Urethane prepolymer PPCL was produced using polycaprolactone polyol (Mn: 850, number of functional groups: 3) (Praccel 308, manufactured and sold by Daicel Chemical Industries, Japan) and HDI in the same manner as mentioned above. Polycaprolactone polyol and HDI were used in the amounts shown in Table 2 so that the NCO group/OH group molar ratio of the resultant mixture became 15. The fluidity of urethane prepolymer PPCL was inferior to that of urethane prepolymer PA. The polymerizing conditions for producing urethane prepolymer PPCL and the properties of urethane prepolymer PPCL are shown in Table 2.

7.08 parts by weight of urethane prepolymer PA and 7.08 parts by weight of urethane prepolymer PPCL were mixed together, thereby obtaining a curing agent for a coating composition. To the obtained curing agent was added 25 parts by weight of an acryl polyol (OH value: 50 mg KOH/g, Tg: 70° C.) (ACLYDIC A801, manufactured and sold by DAINIPPON INK & CHEMICALS, INC., Japan) as a main component of the coating composition, and the viscosity of the resultant mixture was adjusted to a value of 15 seconds in terms of the time measured using Ford viscosity cup No. 4, by diluting the mixture with toluene, to thereby obtain a coating composition. The obtained coating composition was spray coated on a polypropylene substrate having a length of 15 cm and a width of 15 cm, and the coating was dried at 20° C. at a relative humidity of 60% for 1 week. The coating was removed from the substrate to thereby obtain a sheet having a thickness of 100 μm. Elongation at break and tensile strength at break of the obtained sheet were measured in accordance with JIS K6301 at -30° C. (wherein a strip having a width of 10 mm and a thickness of 100 μm was prepared from the sheet and used as a test specimen, the distance between chucks was 50 mm and the rate of elongation was 100%/min). The sheet exhibited excellent properties with respect to both the elongation at break and tensile strength at break, that is, the elongation at break of 145% and the tensile strength at break of 122 kgf/cm$^2$. The drying characteristic of the sheet was also excellent. Further, the sheet had excellent flexibility. The composition of the coating composition is shown in Table 3 together with the properties of the coating.

Further, the above-prepared curing agent was mixed with a fluorine type polyol (LUMIFLON 2000, manufactured and sold by Asahi Glass Co., Ltd., Japan) which is used as a main component for a coating composition, and a film was prepared using the resultant mixture. The prepared film was visually observed, and it was found that the film was not turbid. From the above result, it was understood that the curing agent prepared using the urethane prepolymer of the present invention had excellent compatibility with a fluorine type polyol.

EXAMPLE 2

Urethane prepolymer PB was produced in substantially the same manner as in Example 1, except that PTMG (B) having a smaller Mn than that of PTMG (A) was used instead of PTMG (A), and PTMG (B) and HDI were used in amounts shown in Table 2 so that the NCO group/OH group molar ratio of a PTMG (B)/HDI mixture became 15. The properties of urethane prepolymer PB are shown in Table 2.

Using urethane prepolymer PB, a coating composition was produced in substantially the same manner as in Example 1, except that the amounts of the components for the composition were changed as shown in Table 3. A coating was formed and the properties of the formed coating were evaluated in the same manner as in Example 1.

Further, with respect to the curing agent prepared using the urethane prepolymer (prepolymer PB) of the present invention, the compatibility of the curing agent with a fluorine type polyol was evaluated in the same manner as in Example 1. The results are shown in Table 3.

Comparative Example 1

Urethane prepolymer PE was produced in substantially the same manner as in Example 1, except that PTMG (E) (commercially available PTMG) having an Mn close to that of PTMG (A) was used instead of PTMG (A), and PTMG (E) and HDI were used in amounts shown in Table 2 so that the NCO group/OH group molar ratio of a PTMG (E)/HDI mixture became 15. The properties of urethane prepolymer PE are shown in Table 2. Contrary to urethane prepolymer PA, urethane prepolymer PE was wax like and had no fluidity.

Using urethane prepolymer PE, a coating composition was prepared in substantially the same manner as in Example 1, except that the amounts of the components for the composition were changed as shown in Table 3. A coating was formed and the properties of the formed coating were evaluated in the same manner as in Example 1. The properties of the coating are shown in Table 3. The drying characteristic of the obtained coating was far inferior to that of the coating obtained in Example 1 which was prepared using a PTMG having an Mn close to that of PTMG (E).

Further, with respect to the curing agent for the coating composition, which was prepared by mixing urethane prepolymer PE and urethane prepolymer PPCL, the compatibility of the curing agent with a fluorine type polyol was evaluated by visual observation in the same manner as in Example 1. As a result, it was observed that the film prepared for evaluating the compatibility of the curing agent was extremely turbid as compared to the film produced in Example 1 in which a PTMG having an Mn close to that of PTMG (E) was used. It has become apparent from this result that the curing agent prepared using urethane prepolymer PE has an unsatisfactory level with respect to the compatibility thereof with a fluorine type polyol.

Comparative Example 2

Urethane prepolymer PF was produced in substantially the same manner as in Example 1, except that PTMG (F) (commercially available PTMG) having an Mn close to that of PTMG (B) was used instead of PTMG (A), and PTMG (F) and HDI were used in amounts shown in Table 2 so that the NCO group/OH group molar ratio of a PTMG (F)/HDI mixture became 15. The fluidity of urethane prepolymer PF was slightly inferior to that of urethane prepolymer PB. The properties of urethane prepolymer PF are shown in Table 2.

Using urethane prepolymer PF, a coating composition was prepared in substantially the same manner as in Example 1, except that the amounts of components for the composition were changed as shown in Table 3. A coating was formed and the properties of the formed coating were evaluated in the same manner as in Example 1. The properties of the coating are shown in Table 3. The drying characteristic of the obtained coating was far inferior to that of the coating obtained in Example 2 in which a PTMG having an Mn close to that of PTMG (F) was used.

Further, with respect to the curing agent for the coating composition, which was prepared by mixing urethane prepolymer PF and urethane prepolymer PPCL, the compatibility of the curing agent with a fluorine type polyol was evaluated by visual observation in the same manner as in Example 1. As a result, it was observed that the film prepared for evaluating the compatibility of the curing agent was turbid, differing from the film produced in Example 2 in which a PTMG having an Mn close to that of PTMG (E) was used. It has become apparent from this result that the curing agent prepared using urethane prepolymer PF has an unsatisfactory level with respect to the compatibility thereof with a fluorine type polyol.

TABLE 2

Raw materials used for producing prepolymers and amounts thereof, and properties of prepolymers

| | Prepolymer | PA | PB | PE | PF | PPCL |
|---|---|---|---|---|---|---|
| Raw materi- | PTMG | A | B | E | F | PCL* |
| | Amount of | 450 | 350 | 450 | 350 | 213 |

TABLE 2-continued

Raw materials used for producing prepolymers and amounts thereof, and properties of prepolymers

| | Prepolymer | PA | PB | PE | PF | PPCL |
|---|---|---|---|---|---|---|
| als | PTMG (g) Amount of HDI (g) | 616 | 1013 | 597 | 953 | 945 |
| Yield (g) | | 525 | 480 | 524 | 472 | 330 |
| Properties of the prepolymer | NCO group content (wt %) | 3.8 | 6.9 | 3.7 | 6.6 | 9.4 |
| | HDI concentration (wt %) | 0.1 | 0.1 | 0.1 | 0.1 | 0.1 |
| | Fluidity | ○ | ○ | X | Δ | X |

*PCL is a polymeric polyol other than PTMG.

TABLE 3

Compositions and properties of coating compositions

| | Example 1 | Example 2 | Comparative Example 1 | Comparative Example 2 |
|---|---|---|---|---|
| Urethane prepolymer | PA | PB | PE | PF |
| NCO content (wt %) | 3.8 | 6.9 | 3.7 | 6.6 |
| Parts by weight | 7.08 | 5.75 | 7.15 | 5.85 |
| Other prepolymer | PPCL | PPCL | PPCL | PPCL |
| NCO content (wt %) | 9.4 | 9.4 | 9.4 | 9.4 |
| Parts by weight | 7.08 | 5.75 | 7.15 | 5.85 |
| ACLYDIC A801 Parts by weight | 25.0 | 25.0 | 25.0 | 24.0 |
| Drying characteristic | ○ | ○ | Δ | X |
| Elongation at break (%) | 145 | 110 | 123 | 100 |
| Tensile strength at break (kgf/cm$^2$) | 122 | 150 | 110 | 132 |
| Compatibility with fluorine type polyol | ○ | ○ | X | Δ |

EXAMPLE 3

A 2-liter flask provided with a thermometer, a refrigerator and a stirrer was charged with 110 g of 4,4'-diphenylmethane diisocyanate (MDI) and 200 g of PTMG (B) produced in Reference Example 2. A reaction was performed at 60° C. for 5 hours with stirring to thereby obtain a urethane prepolymer. 19 g of 1,4-butanediol (hereinafter, referred to simply as "1,4BD") was added to the obtained urethane prepolymer, and after stirring the resultant mixture for several minutes, the mixture was introduced into a glass mold to thereby obtain a polyether polyurethane in the form of a sheet as a test specimen (dumbbell No. 3). The obtained test specimen was kept in an incubator maintained at 20° C. for 1 week. Subsequently, the hardness, tensile strength at break, and elongation at break (JIS K6301) of the test specimen were evaluated. The results are shown in Table 4.

Comparative Example 3

A polyether polyurethane sheet was produced in substantially the same manner as in Example 3, except that PTMG (F) (commercially available PTMG) was used instead of PTMG (B) in the same molar amount as that of PTMG (B) used in Example 3. The properties of the produced polyether polyurethane sheet were evaluated. The results are shown in Table 4.

TABLE 4

Properties of polyether polyurethane sheets

|  | Example 3 | Comparative Example 3 |
|---|---|---|
| PTMG | B | F |
| Hardness | 88 | 88 |
| Elongation at break (kgf/cm$^2$) | 465 | 460 |
| Tensile strength at break (%) | 590 | 540 |

EXAMPLE 4

A predetermined amount of PTMG (A) was weighed into a separable flask and dried under a reduced pressure in a nitrogen atmosphere for approximately 2 hours at 80° C. MDI was added to the dried PTMG (A) so that the NCO group/OH group molar ratio of the resultant mixture became 3.30. In a nitrogen atmosphere, the resultant mixture was placed in an oil bath maintained at approximately 70° C. to thereby synthesize a urethane prepolymer.

1 kg of the synthesized urethane prepolymer was added to a 2-litter vessel and degassed for approximately 40 minutes. Subsequently, 1,4-BD was added to the vessel in an amount wherein the molar ratio of the NCO group of the urethane prepolymer to the OH group of 1,4-BD became 1.03, followed by stirring for approximately 90 seconds to thereby obtain a mixture. The obtained mixture of urethane prepolymer and 1,4-BD was introduced into a mold which had been heated to and maintained at 130° C., and subjected to crosslinking reaction at 130° C. for 2 hours, thereby obtaining a sheet. The obtained sheet was removed from the mold and subjected to post-crosslinking reaction at 100° C. for 24 hours, thereby obtaining a polyether polyurethane sheet. The tensile strength at break and elongation at break of the obtained polyether polyurethane sheet were measured in accordance with JIS K6254 (wherein a strip having a width of 5 mm and a thickness of 2 mm was used as a test specimen, the distance between chucks was 30 mm, and the rate of elongation was 10 mm/min (33.33%/min)). The tensile strength at break and the elongation at break of the strip were 34.3 MPa and 990%, respectively. Further, a test specimen of the polyether polyurethane sheet was kept at 110° C. to evaluate the degree of discoloration thereof. As a result, it was found that the polyether polyurethane sheet suffered only a slight discoloration.

EXAMPLE 5

After degassing PTMG (A), 92 g (0.05 mol) of PTMG (A) was weighed into a separable flask, and 41.30 g (0.165 mol) of molten MDI was added thereto, thereby obtaining a mixture. (PTMG (A) and MDI were used in amounts wherein the NCO group/OH group molar ratio became 3.30.) The obtained mixture was heated in an oil bath maintained at 80° C. and a reaction was performed while introducing nitrogen gas into the flask and while stirring the mixture in the flask. The NCO group content of the reaction mixture was measured by amine equivalent method, and the reaction was terminated when the conversion of the OH group in the reaction mixture reached 100%, thereby obtaining a urethane prepolymer. 100 g of the obtained urethane prepolymer was placed in a stainless steel vessel and 7.54 g (0.0838 mol) of 1,4-BD was added thereto (molar ratio of the NCO group of the prepolymer to the OH group of 1,4-BD was 1.03). Immediately after the addition of 1,4-BD, the contents of the stainless steel vessel were stirred for 90 seconds while preventing the formation of the bubbles. The resultant mixture was introduced into a mold and heated at 130° C. for 90 minutes for performing a further reaction, thereby obtaining a polyether polyurethane sheet. The produced polyether polyurethane sheet was removed from the mold and heated at 110° C. for 16 hours to thereby obtain a polyether polyurethane sheet for evaluations of various properties.

The tensile strength at break and elongation at break of the obtained polyether polyurethane sheet were measured (in accordance with JIS K6301 using a dumbbell No. 3 prescribed therein). In addition, the Dunlop impact resilience of the polyether polyurethane sheet was measured. As shown in Table 5, the obtained polyether polyurethane sheet was excellent with respect to the tensile strength at break, the elongation at break and the Dunlop impact resilience.

Comparative Example 4

A polyether polyurethane sheet was produced in substantially the same manner as in Example 5, except that PTMG (K) (commercially available PTMG) was used instead of PTMG (A) in the same molar amount as that of PTMG (A) used in Example 5.

The tensile strength at break, elongation at break and Dunlop impact resilience of the produced polyether polyurethane sheet were measured. The results are shown in Table 5.

Comparative Example 5

A polyether polyurethane sheet was produced in substantially the same manner as in Example 5, except that PTMG (L) (commercially available PTMG) was used instead of PTMG (A) in the same molar amount as that of PTMG (A) used in Example 5.

The tensile strength at break, elongation at break, and Dunlop impact resilience of the produced polyether polyurethane sheet were measured. The results are shown in Table 5.

Comparative Example 6

A polyether polyurethane sheet was produced in substantially the same manner as in Example 5, except that PTMG (M) (commercially available PTMG) was used instead of PTMG (A) in the same molar amount as that of PTMG (A) used in Example 5.

The tensile strength at break, elongation at break and Dunlop impact resilience of the produced polyether polyurethane sheet were measured. The results are shown in Table 5.

Comparative Example 7

A polyether polyurethane sheet was produced in substantially the same manner as in Example 5, except that PTMG (E) (commercially available PTMG) was used instead of PTMG (A) in the same molar amount as that of PTMG (A) used in Example 5.

The tensile strength at break, elongation at break and Dunlop impact resilience of the produced polyether polyurethane sheet were measured. The results are shown in Table 5.

TABLE 5

Properties of polyether polyurethane sheets

|  | Ex. 5 | Comp. Ex. 4 | Comp. Ex. 5 | Comp. Ex. 6 | Comp. Ex. 7 |
|---|---|---|---|---|---|
| PTMG | A | K | L | M | E |
| Tensile strength at break (kgf/cm$^2$) | 510 | 481 | 223 | 380 | 447 |
| Elongation at break (%) | 610 | 600 | 530 | 590 | 580 |
| Dunlop impact resilience | 67.5 | 66.4 | 64.6 | 66 | 66.4 |

EXAMPLE 6

A predetermined amount of PTMG (A) was weighed into a separable flask and dried under reduced pressure in a nitrogen atmosphere for approximately 2 hours at 80° C. Then, MDI was added to the dried PTMG (A) so that the molar ratio of the NCO group of MDI to the OH group of PTMG became 3.30. In a nitrogen atmosphere, the resultant mixture was placed in an oil bath maintained at approximately 70° C. to thereby synthesize a urethane prepolymer. The NCO group content of the reaction mixture was measured by the amine equivalent method, and the reaction was terminated after confirming that substantially all of the OH groups of PTMG had been reacted.

1 kg of the synthesized urethane prepolymer was added to a 2-litter vessel and degassed for approximately 40 minutes. Subsequently, 1,4-BD was added to the vessel in an amount wherein the molar ratio of the NCO group of the urethane prepolymer to the OH group of 1,4-BD became 1.03, followed by stirring for approximately 90 seconds to thereby obtain a mixture. The obtained mixture of urethane prepolymer and 1,4-BD was introduced into a mold which had been heated to and maintained at 130° C., and subjected to crosslinking reaction at 130° C. for 2 hours, thereby obtaining a sheet. The obtained sheet was removed from the mold and subjected to post-crosslinking reaction at 100° C. for 24 hours, thereby obtaining a polyether polyurethane sheet. The raw materials used for producing the polyether polyurethane sheet and the amounts thereof are shown in Table 6.

The stress-strain curve shown in FIG. 3 was prepared using the obtained polyether polyurethane sheet. Further, the tensile strength at break and the elongation at break were measured, and the viscoelasticity index ($2C_1$) was determined from the measured values. The tensile strength at break and the elongation at break were evaluated in accordance with JIS K6254 (wherein a strip having a width of 5 mm and a thickness of 2 mm was used as a test specimen, the distance between chucks was 30 mm and the rate of elongation was 10 mm/min (33.33%/min)). The results are shown in Table 6.

Figure 4:
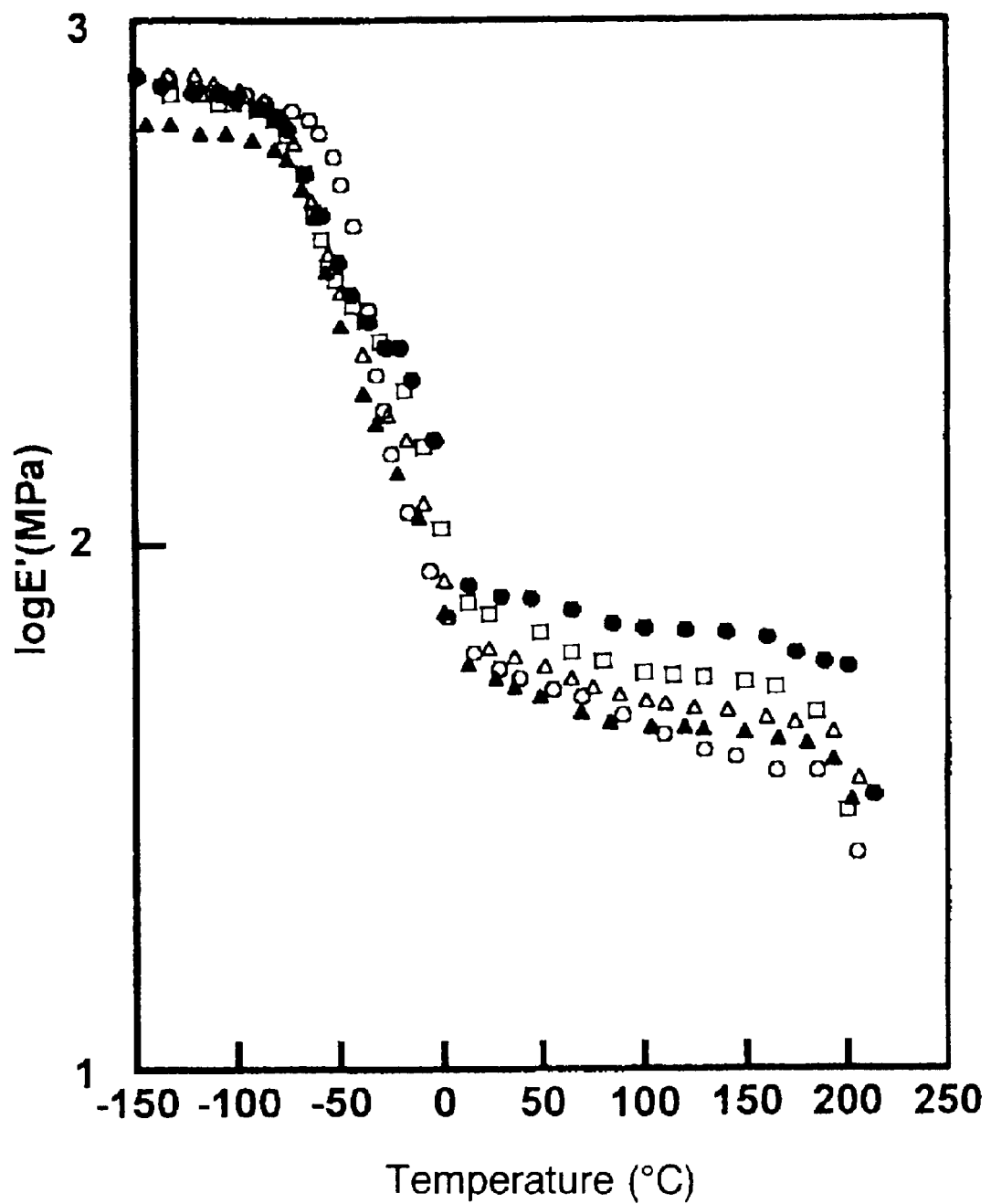
FIG. 4 is a graph showing the temperature dependencies of the dissipation factors (tan δ) of polyether polyurethanes, wherein each ○ represents the polyether polyurethane produced in Example 6, each Δ represents the polyether polyurethane produced in Comparative Example 8, each ☐ represents the polyether polyurethane produced in Comparative Example 9, each ● represents the polyether polyurethane produced in Comparative Example 10, and each ▼ represents the polyether polyurethane produced in Comparative Example 11.
Figure 5:
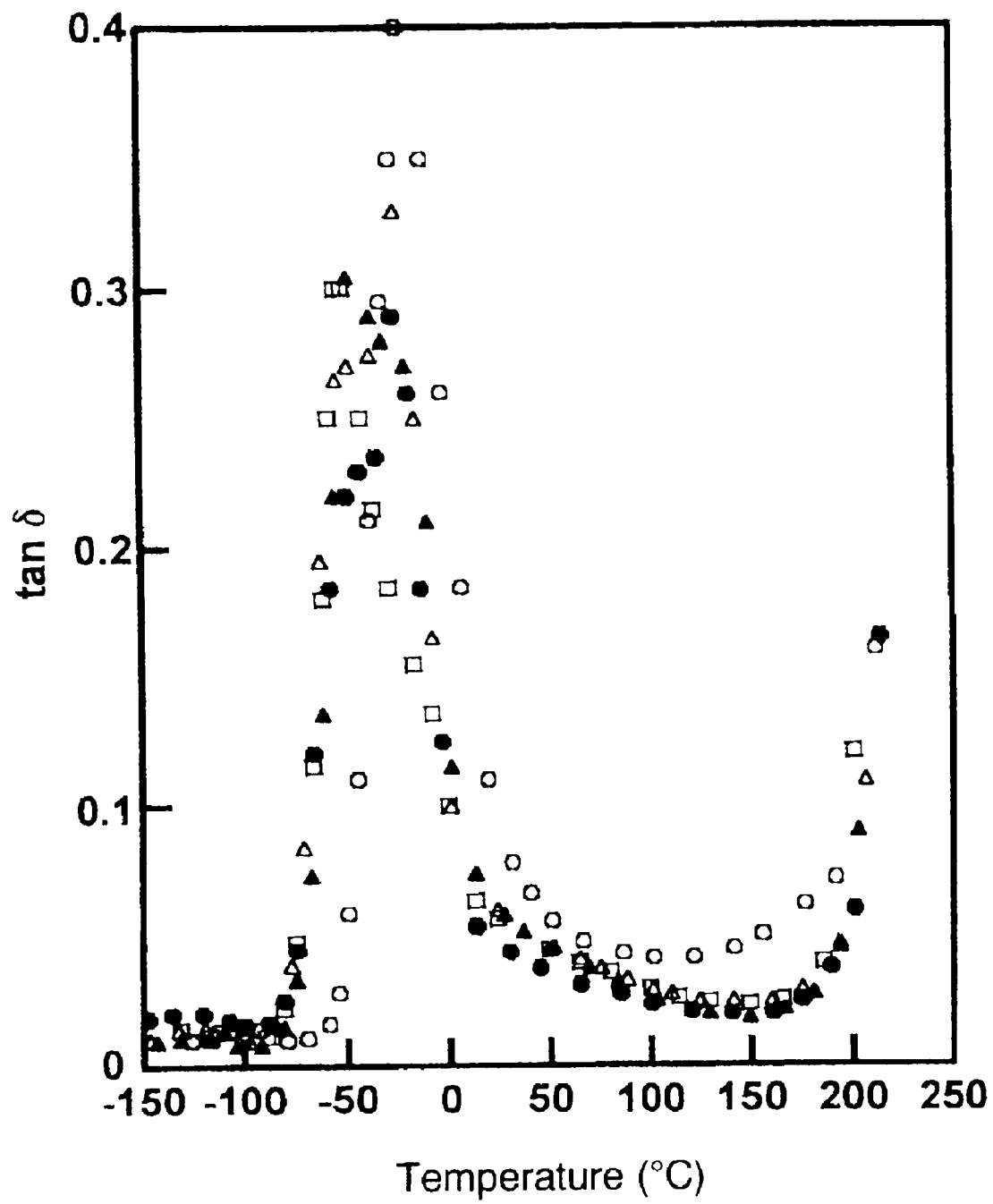
FIG. 5 is a graph showing the temperature dependencies of the storage elastic moduli (E') of polyether polyurethanes, wherein each ○ represents the polyether polyurethane produced in Example 6, each Δ represents the polyether polyurethane produced in Comparative Example 8, each ☐ represents the polyether polyurethane produced in Comparative Example 9, each ● represents the polyether polyurethane produced in Comparative Example 10, and each ▼ represents the polyether polyurethane produced in Comparative Example 11.

Further, using the obtained polyether polyurethane sheet, the temperature dependencies of the dissipation factor (tan δ) and of the storage elastic modulus (E') were evaluated. The results are shown in FIGS. 4 and 5, respectively.

A test specimen (having a length of 0.5 cm, a width of 0.5 cm and a thickness of 10 to 100 μm) for microscopic observation was prepared from a part of the obtained polyether polyurethane sheet. A polarization photomicrograph (magnification:×4,000) of the test specimen was taken under the polarization microscope using crossed Nicols. Another polarization photomicrograph was taken using a sensible color plate. The obtained polarization photomicrographs are, respectively, shown in FIGS. 6(a) and 6(b).

Comparative Example 8

A polyether polyurethane sheet was produced in substantially the same manner as in Example 6, except that PTMG (L) (commercially available PTMG) was used instead of PTMG (A). The raw materials used for producing the polyether polyurethane sheet and the amounts thereof are shown in Table 6.

The stress-strain curve shown in FIG. 3 was prepared using the polyether polyurethane sheet. Further, the tensile strength at break and the elongation at break were measured, and the viscoelasticity index ($2C_1$) was determined from the measured values. The results are shown in Table 6.

Further, using the polyether polyurethane sheet, the temperature dependencies of the dissipation factor (tan δ) and of the storage elastic modulus (E') were evaluated. The results are shown in FIGS. 4 and 5, respectively.

Figure 6A:
Figure 6B:
Figure 6C:
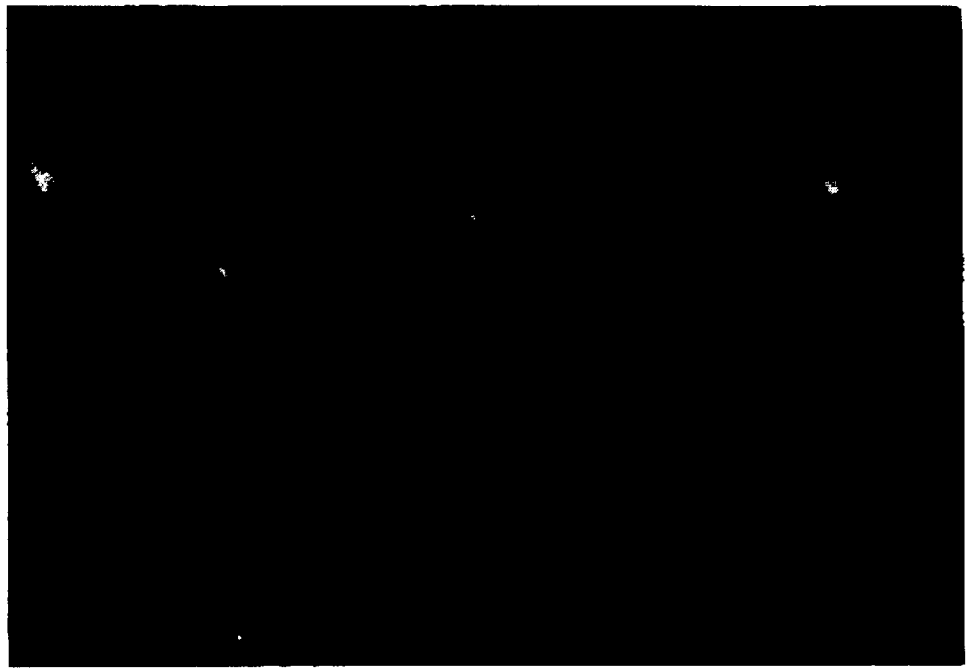
Figure 6D:
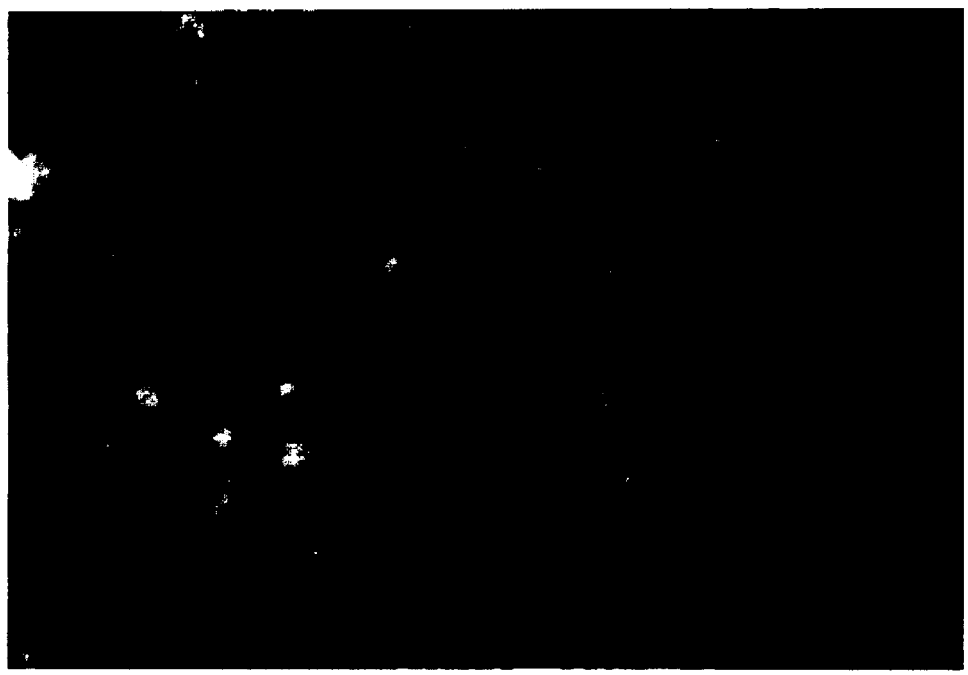

The polarization photomicrographs of the polyether polyurethane sheet were taken and shown in FIGS. 6(c) and 6(d).

Comparative Example 9

A polyether polyurethane sheet was produced in substantially the same manner as in Example 6, except that PTMG (K) (commercially available PTMG) was used instead of PTMG (A). The raw materials used for producing the polyether polyurethane sheet and the amounts thereof are shown in Table 6.

The stress-strain curve shown in FIG. 3 was prepared using the polyether polyurethane sheet. Further, the tensile strength at break and the elongation at break were measured, and the viscoelasticity index ($2C_1$) was determined from the measured values. The results are shown in Table 6.

Further, using the polyether polyurethane sheet, the temperature dependencies of the dissipation factor (tan δ) and of the storage elastic modulus (E') were evaluated. The results are shown in FIGS. 4 and 5, respectively.

Figure 6E:
Figure 6F:
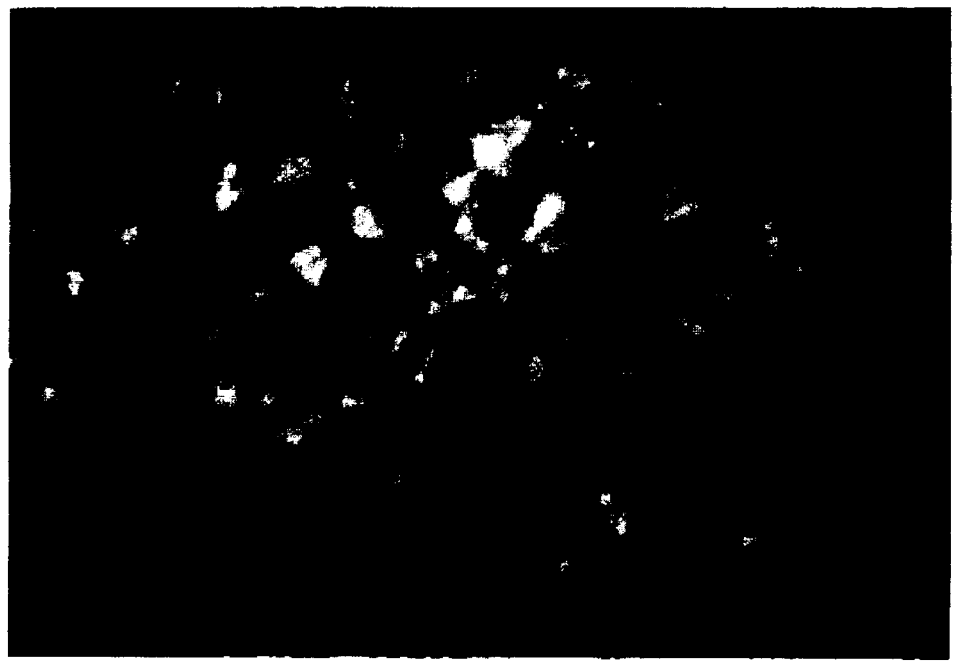

The polarization photomicrographs of the polyether polyurethane sheet were taken and shown in FIGS. 6(e) and 6(f).

Comparative Example 10

A polyether polyurethane sheet was produced in substantially the same manner as in Example 6, except that PTMG (M) (commercially available PTMG) was used instead of PTMG (A). The raw materials used for producing the polyether polyurethane sheet and the amounts thereof are shown in Table 6.

The stress-strain curve shown in FIG. 3 was prepared using the polyether polyurethane sheet. Further, the tensile strength at break and the elongation at break were measured, and the viscoelasticity index ($2C_1$) was determined from the measured values. The results are shown in Table 6.

Further, using the polyether polyurethane sheet, the temperature dependencies of the dissipation factor (tan δ) and of the storage elastic modulus (E') were evaluated. The results are shown in FIGS. 4 and 5, respectively.

Figure 6G:
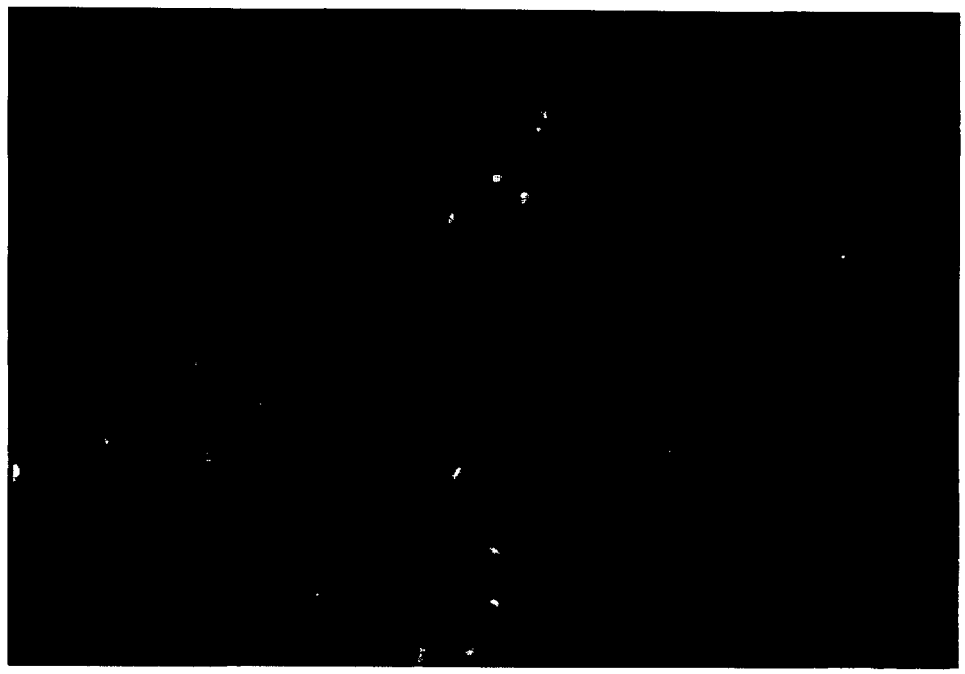
Figure 6H:
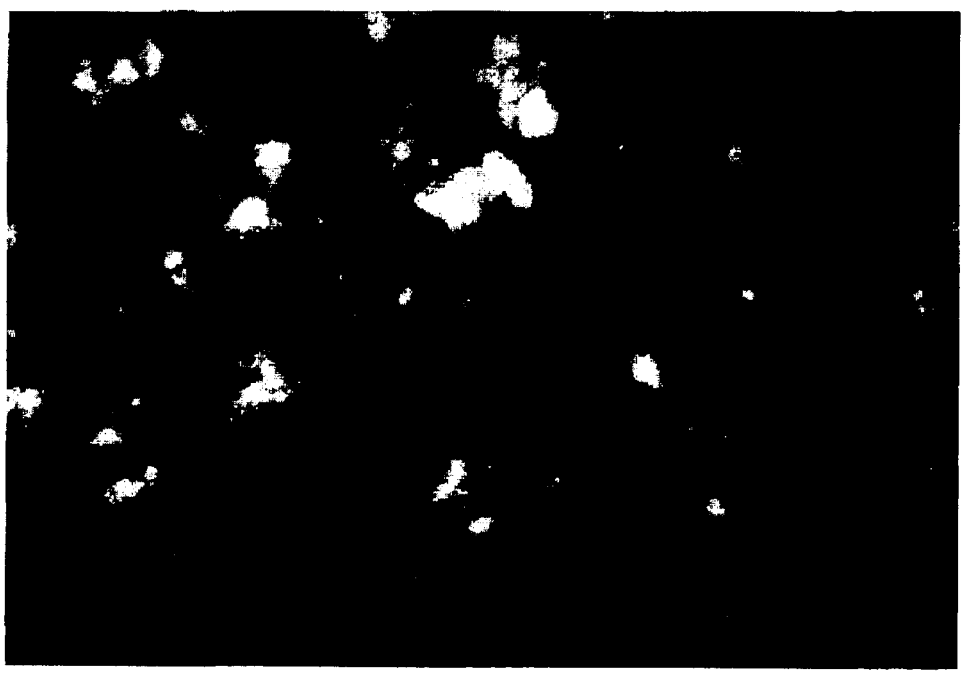

The polarization photomicrographs of the polyether polyurethane sheet were taken and shown in FIGS. 6(g) and 6(h).

Comparative Example 11

A polyether polyurethane sheet was produced in substantially the same manner as in Example 6, except that PTMG (E) (commercially available PTMG) was used instead of PTMG (A). The raw materials used for producing the polyether polyurethane sheet and the amounts thereof are shown in Table 6.

The stress-strain curve shown in FIG. 3 was prepared using the polyether polyurethane sheet. Further, the tensile strength at break and the elongation at break were measured, and the viscoelasticity index ($2C_1$) was determined from the measured values. The results are shown in Table 6.

Further, using the polyether polyurethane sheet, the temperature dependencies of the dissipation factor (tan δ) and of the storage elastic modulus (E') were evaluated and shown in FIGS. 4 and 5, respectively.

Figure 6I:
Figure 6J:
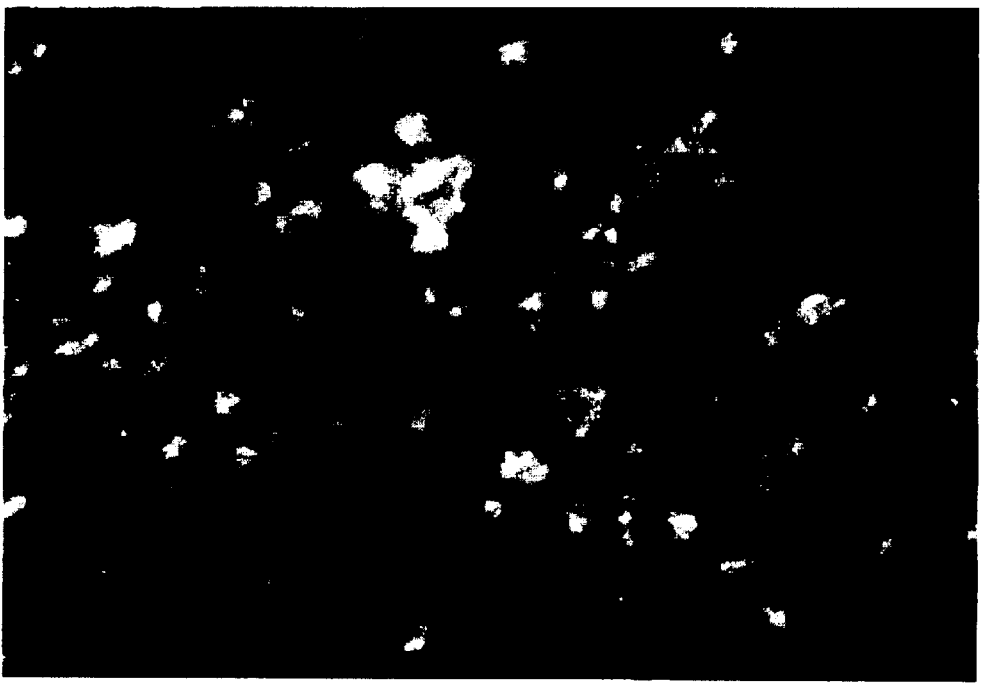

The polarization photomicrographs of the polyether polyurethane sheet were taken and shown in FIGS. 6(i) and 6(j).

TABLE 6

Raw materials used for preparing polyether polyurethane sheets and amounts thereof, and properties of polyether polyurethane sheets

|  | Ex. 6 | Comp. Ex. 8 | Com. Ex. 9 | Comp. Ex. 10 | Comp. Ex. 11 |
|---|---|---|---|---|---|
| PTMG | A | L (purchased product) | K (purchased product) | M (purchased product) | E (purchased product) |
| Molar ratio of PTMG/ MDI/ 1,4-BD | 1/ 3.30/ 2.25 | 1/ 3.31/ 2.22 | 1/ 3.33/ 2.26 | 1/ 3.30/ 2.24 | 1/ 3.28/ 2.22 |
| Tensile strength at break $\sigma_b$ (MPa) | 34.3 | 31.9 | 31.9 | 32.6 | 31.9 |
| Elongation at break $\epsilon_b$ (%) | 993 | 912 | 896 | 980 | 900 |
| $2C_1$ | 0.92 | 0.76 | 0.77 | 0.83 | 0.76 |

As apparent from FIG. 3, the polyether polyurethane of the present invention which was produced (in Example 6) using the specific PTMG (having a narrow molecular weight distribution) exhibited a large elongation at low stress, and the elongation increased in accordance with the increase in the stress applied to the test specimen. Further, as apparent from Table 6, the polyether polyurethane of the present invention had high tensile strength at break and high elongation at break, both of which were higher than exhibited by the polyether polyurethanes of the Comparative Examples. The viscoelasticity ($2C_1$) of the polyether polyurethane of the present invention was also higher than exhibited by the polyether polyurethanes of the Comparative Examples, and these results as well as the photomicrographs of FIGS. 6(a) and 6(b) show that the phase separation between the hard segment and the soft segment occurred satisfactorily in the polyether polyurethane of the present invention. Specifically, many distinct spherulites are observed in the polarization photomicrographs of the polyether polyurethane of the present invention which are shown in FIGS. 6(a) and 6(b), which clearly indicates that the phase separation between the hard segment and the soft segment occurred satisfactorily in the polyether polyurethane of the present invention. The occurrence of such phase separation between the hard segment and the soft segment means that the polyether polyurethane of the present invention has excellent properties required for an elastic material.

Further, from the graphs shown in FIGS. 4 and 5, it is considered that the polyether polyurethane of the present invention, which is produced using a PTMG having narrow molecular weight distribution, has a uniform relaxation distribution, as compared to those of the polyether polyurethanes produced in the Comparative Examples using the PTMG's, each having a wide molecular weight distribution. Specifically, in FIG. 4, the polyether polyurethane of the present invention (which is designated as ○ in FIG. 4) exhibits the highest main dispersion peak (a peak positioned between −100° C. and 50° C.) among the peaks shown in FIG. 4 and, in addition, the width of the peak of the polyether polyurethane of the present invention is the smallest among the peaks shown in FIG. 4. In FIG. 5, with respect to the storage elastic modulus of the polyether polyurethane of the present invention (which is designated as ○ in FIG. 5), the slope (representing the variation of storage elastic modulus in accordance with the change in temperature) in the glass transition region positioned between −100° C. and 50° C. was much steeper than those of the polyether polyurethanes obtained in the Comparative Examples. These data also show that the phase separation between the hard segment and the soft segment occurred satisfactorily in the polyether polyurethane of the present invention.

Example 7

A polyether polyurethane sheet was produced in substantially the same manner as in Example 6, except that PTMG (B) was used instead of PTMG (A). The raw materials used for producing the polyether polyurethane sheet and the amounts thereof are shown in Table 7.

Figure 7A:
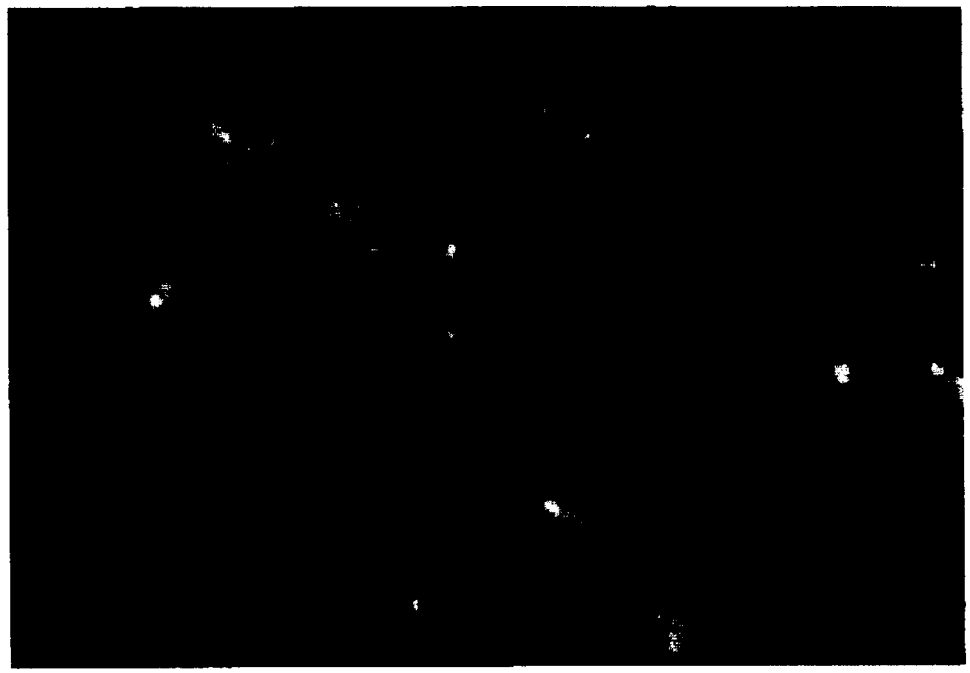
Figure 7B:
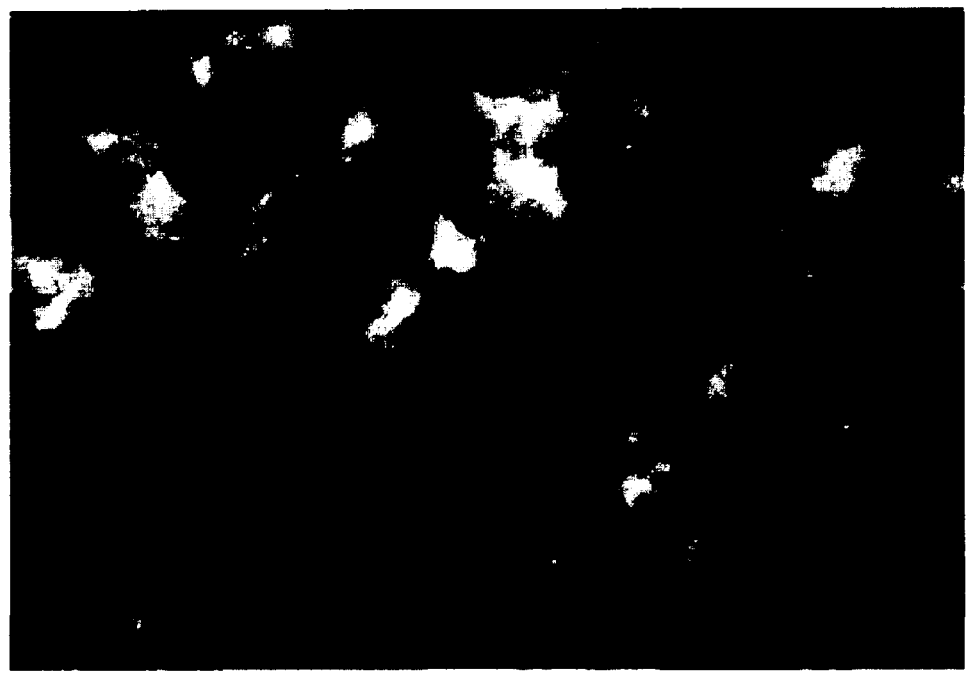

The polarization photomicrographs of the polyether polyurethane sheet were taken in the same manner as in Example 6. The polarization photomicrographs are shown in FIGS. 7(a) and 7(b).

Comparative Example 12

A polyether polyurethane sheet was produced in substantially the same manner as in Example 6, except that PTMG (P) (commercially available PTMG) was used instead of PTMG (A). The raw materials used for producing the polyether polyurethane sheet and the amounts thereof are shown in Table 7.

Figure 7C:
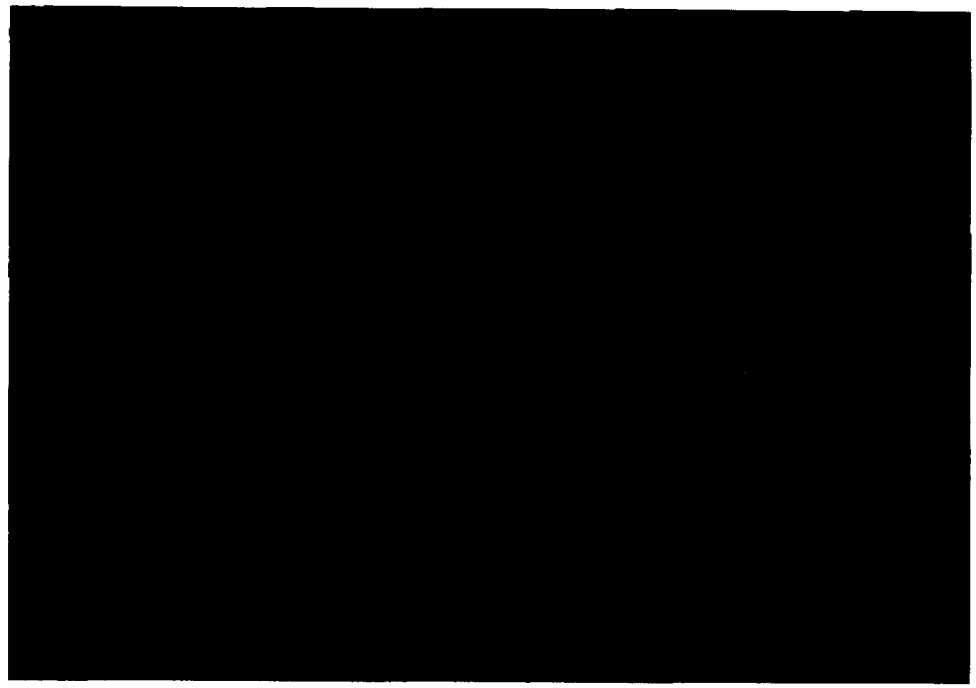
Figure 7D:

The polarization photomicrographs of the polyether polyurethane sheet were taken in the same manner as in Example 6. The polarization photomicrographs are shown in FIGS. 7(c) and 7(d).

TABLE 7

Raw materials used for producing polyether polyurethane sheets and amounts thereof

|  | Example 7 | Comparative Example 12 |
|---|---|---|
| PTMG | B | P (purchased product) |
| Molar ratio of PTMG/MDI/1,4-BD | 1/3.30/2.24 | 1/3.26/2.22 |

As clearly shown in FIGS. 7(a) to 7(d), many spherulites were observed in the polarization photomicrographs of the polyether polyurethane of the present invention. Thus, it was confirmed that the phase separation between the hard segment and the soft segment occurred satisfactorily in the polyether polyurethane of the present invention.

INDUSTRIAL APPLICABILITY

The polyether polyurethane of the present invention exhibits high elasticity and elastic recovery, low permanent compression set, excellent low-temperature characteristics and high flexibility, as compared to those of the conventional polyether polyurethanes, and can be advantageously used for forming a coating which has no surface tack and is unlikely to suffer discoloration. By virtue of these excellent properties, the polyether polyurethane of the present invention can be used in various application fields related to a flexible foam, a flexible molded foam, a semirigid foam, a rigid foam, a flexible RIM product, a rigid RIM product, a cast polyurethane elastomer, a thermoplastic elastomer, a kneaded elastomer and the like. In addition, the urethane prepolymer of the present invention can be advantageously used for producing the above-mentioned excellent polyether polyurethane. Further, when a composition, such as a coating composition, is prepared using the urethane prepolymer of the present invention, the prepared composition also exhibits excellent properties, such as high fluidity before curing, excellent drying characteristic and capability of forming a coating having no surface tack.

What is claimed is:

1. A polyether polyurethane comprising:
   (A) at least one polyisocyanate having two or more isocyanate groups, which is selected from the group consisting of an aromatic polyisocyanate and an aliphatic polyisocyanate;
   (B) a polyoxytetramethylene glycol (PTMG); and
   (C) at least one chain extender selected from the group consisting of a $C_2$–$C_{10}$ polyol having two or more hydroxyl groups and a $C_2$–$C_{10}$ polyamine having two or more amino groups, wherein said PTMG has the following characteristics (1) to (4):
   (1) a number average molecular weight of from 750 to 3,500;
   (2) a molecular weight distribution of 1.75 or less in terms of the Mw/Mn ratio, wherein Mw represents the weight average molecular weight of PTMG and Mn represents the number average molecular weight of PTMG;
   (3) a content of high molecular weight PTMG molecules of 10% by weight or less, based on the total weight of all PTMG molecules, wherein said high molecular weight PTMG molecules are defined as PTMG molecules having molecular weights which are at least six times as large as the number average molecular weight of all PTMG molecules; and
   (4) a heteropolyacid content of from 10 to 900 ppb by weight.

2. The polyether polyurethane according to claim 1, wherein said PTMG is produced by a method which comprises subjecting tetrahydrofuran to a polymerization reaction in a continuous polymerization reactor with a stirrer in the presence of a heteropolyacid catalyst, while feeding tetrahydrofuran to the continuous polymerization reactor,
said polymerization reaction being continuously performed in the presence of water, wherein said water is present in an amount sufficient to form a tetrahydrofuran organic phase and an aqueous tetrahydrofuran/catalyst phase which comprises a solution of the heteropolyacid catalyst in a tetrahydrofuran/water mixture and which has a specific gravity of from 1.8 to 2.3, while maintaining a V/F value at 0.5 to 20 hours wherein V represents the volume ($m^3$) of the liquid in said reactor and F represents the rate ($m^3$/hour) of feeding tetrahydrofuran to said reactor so that the V/F value represents the retention time (hour or hours) of tetrahydrofuran in said reactor and while maintaining a P/V value at 1.3 kW or more wherein P represents the motive power (kW) applied to the liquid in said reactor and V is as defined above so that the P/V value represents the motive power (kW/$m^3$) applied to the liquid per unit volume thereof,
to thereby obtain a polymerization reaction mixture comprising a reaction-formed tetrahydrofuran organic phase containing a PTMG having a number average molecular weight of from 750 to 3,500 and a reaction-formed aqueous tetrahydrofuran/catalyst phase, and
separating said reaction-formed tetrahydrofuran organic phase containing said PTMG from said polymerization reaction mixture.

3. The polyether polyurethane according to claim 1 or 2, wherein the content of high molecular weight PTMG molecules in said PTMG is 2 to 5% by weight.

4. A urethane prepolymer comprising:
   (A) at least one polyisocyanate having two or more isocyanate groups, which is selected from the group consisting of an aromatic polyisocyanate and an aliphatic polyisocyanate; and
   (B) a polyoxytetramethylene glycol (PTMG), said urethane prepolymer having terminal isocyanate groups,
   wherein said PTMG has the following characteristics (1) to (4):
   (1) a number average molecular weight of from 750 to 3,500;
   (2) a molecular weight distribution of 1.75 or less in terms of the Mw/Mn ratio, wherein Mw represents the weight average molecular weight of PTMG and Mn represents the number average molecular weight of PTMG;
   (3) a content of high molecular weight PTMG molecules of 10% by weight or less, based on the total weight of all PTMG molecules, wherein said high molecular weight PTMG molecules are defined as PTMG molecules having molecular weights which are at least six times as large as the number average molecular weight of all PTMG molecules; and
   (4) a heteropolyacid content of from 10 to 900 ppb by weight.

5. The urethane prepolymer according to claim 4, wherein said PTMG is produced by a method which comprises subjecting tetrahydrofuran to a polymerization reaction in a continuous polymerization reactor with a stirrer in the presence of a heteropolyacid catalyst, while feeding tetrahydrofuran to the continuous polymerization reactor,
said polymerization reaction being continuously performed in the presence of water, wherein said water is present in an amount sufficient to form a tetrahydrofuran organic phase and an aqueous tetrahydrofuran/catalyst phase which comprises a solution of the heteropolyacid catalyst in a tetrahydrofuran/water mixture and which has a specific gravity of from 1.8 to 2.3, while maintaining a V/F value at 0.5 to 20 hours wherein V represents the volume ($m^3$) of the liquid in said reactor and F represents the rate ($m^3$/hour) of feeding tetrahydrofuran to said reactor so that the V/F value represents the retention time (hour or hours) of tetrahydrofuran in said reactor and while maintaining a P/V value at 1.3 kw or more wherein P represents the motive power (kW) applied to the liquid in said reactor and V is as defined above so that the P/V value represents the motive power (kW/$m^3$) applied to the liquid per unit volume thereof,
to thereby obtain a polymerization reaction mixture comprising a reaction-formed tetrahydrofuran organic phase containing a PTMG having a number average molecular weight of from 750 to 3,500 and a reaction-formed aqueous tetrahydrofuran/catalyst phase, and separating said reaction-formed tetrahydrofuran organic phase containing said PTMG from said polymerization reaction mixture.

6. The urethane prepolymer according to claim 4 or 5, wherein the content of high molecular weight PTMG molecules in said PTMG is 2 to 5% by weight.

7. A modified urethane prepolymer, obtained by a process comprising:

reacting (A) at least one polyisocyanate having two or more isocyanate groups, which is selected from the group consisting of an aromatic polyisocyanate and an aliphatic polyisocyanate, with (B) a polyoxytetramethylene glycol (PTMG), to obtain a urethane prepolymer having terminal isocyanate groups, and partly or wholly modifying said terminal isocyanate groups with at least one functional group other than an isocyanate group, so that said at least one functional group is introduced to said terminal isocyanate groups by addition, wherein said PTMG has the following characteristics (1) to (3):

(1) a number average molecular weight of from 750 to 3,500;

(2) a molecular weight distribution of 1.75 or less in terms of the Mw/Mn ratio, wherein Mw represents the weight average molecular weight of PTMG and Mn represents the number average molecular weight of PTMG; and (3) a content of high molecular weight PTMG molecules of 10% by weight or less, based on the total weight of all PTMG molecules, wherein said high molecular weight PTMG molecules are defined as PTMG molecules having molecular weights which are at least six times as large as the number average molecular weight of all PTMG molecules.

8. The modified urethane prepolymer according to claim 7, wherein said PTMG is produced by a method which comprises subjecting tetrahydrofuran to a polymerization reaction in a continuous polymerization reactor with a stirrer in the presence of a heteropolyacid catalyst, while feeding tetrahydrofuran to the continuous polymerization reactor, said polymerization reaction being continuously performed in the presence of water, wherein said water is present in an amount sufficient to form a tetrahydrofuran organic phase and an aqueous tetrahydrofuran/catalyst phase which comprises a solution of the heteropolyacid catalyst in a tetrahydrofuran/water mixture and which has a specific gravity of from 1.8 to 2.3, while maintaining a V/F value at 0.5 to 20 hours wherein V represents the volume ($m^3$) of the liquid in said reactor and F represents the rate ($m^3$/hour) of feeding tetrahydrofuran to said reactor so that the V/F value represents the retention time (hour or hours) of tetrahydrofuran in said reactor and while maintaining a P/V value at 1.3 kW or more wherein P represents the motive power (kW) applied to the liquid in said reactor and V is as defined above so that the P/V value represents the motive power (kW/$m^3$) applied to the liquid per unit volume thereof, to thereby obtain a polymerization reaction mixture comprising a reaction-formed tetrahydrofuran organic phase containing a PTMG having a number average molecular weight of from 750 to 3,500 and a reaction-formed aqueous tetrahydrofuran/catalyst phase, and separating said reaction-formed tetrahydrofuran organic phase containing said PTMG from said polymerization reaction mixture.

9. The modified urethane prepolymer according to claim 7 or 8, wherein the content of high molecular weight PTMG molecules in said PTMG is 2 to 5% by weight.

10. The modified urethane prepolymer according to claim 7 or 8, wherein said functional group is selected from the group consisting of a (meth)acryloyl group and a silyl group.

* * * * *